United States Patent
Cai et al.

(10) Patent No.: US 11,563,699 B2
(45) Date of Patent: Jan. 24, 2023

(54) MACHINE NATURAL LANGUAGE PROCESSING FOR SUMMARIZATION AND SENTIMENT ANALYSIS

(71) Applicant: ROYAL BANK OF CANADA, Montreal (CA)

(72) Inventors: Yixian Cai, Toronto (CA); Amir Ghaderi, Toronto (CA); Ankit Khirwadkar, Toronto (CA); Chetana Chavda, Toronto (CA); Pei Hu, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 537 days.

(21) Appl. No.: 16/409,756

(22) Filed: May 10, 2019

(65) Prior Publication Data

US 2019/0349321 A1    Nov. 14, 2019

Related U.S. Application Data

(60) Provisional application No. 62/669,488, filed on May 10, 2018, provisional application No. 62/669,484, filed on May 10, 2018.

(51) Int. Cl.
| | |
|---|---|
| *G06F 15/16* | (2006.01) |
| *H04L 51/02* | (2022.01) |
| *G06N 20/00* | (2019.01) |
| *G06N 5/02* | (2006.01) |
| *G06F 16/9038* | (2019.01) |

(Continued)

(52) U.S. Cl.
CPC .......... *H04L 51/02* (2013.01); *G06F 16/9038* (2019.01); *G06F 40/237* (2020.01); *G06F 40/284* (2020.01); *G06F 40/40* (2020.01); *G06N 5/02* (2013.01); *G06N 20/00* (2019.01)

(58) Field of Classification Search
CPC ..... H04L 51/02; H04L 51/16; G06F 16/9038; G06F 40/284; G06F 40/40; G06F 40/47; G06F 40/20; G06N 20/00; G06N 5/02
See application file for complete search history.

(56) References Cited

U.S. PATENT DOCUMENTS

| | | | |
|---|---|---|---|
| 6,751,619 B1 * | 6/2004 | Rowstron | G06F 16/284 |
| 2010/0100412 A1 * | 4/2010 | Cases | G06Q 10/0633 |
| | | | 705/7.27 |

(Continued)

*Primary Examiner* — Yves Dalencourt
(74) *Attorney, Agent, or Firm* — Norton Rose Fulbright Canada LLP

(57) ABSTRACT

A virtual agent can implement a "chatbot" to provide output based on predictive/prescriptive models for incidents. The virtual agent can integrate with natural language processor for text analysis and summary report generation. The virtual agent can integrate with cognitive search to enable processing of search requests and retrieval of search results. The virtual agent uses computing processes with self-learning systems that use data mining, pattern recognition and natural language processing to mimic the way the human brain works. The virtual agent provides an automated IT system that is capable of resolving incidents without requiring human assistance. The virtual agent can display condensed summaries of a large amount of data and can link the summaries to predictive models and operational risk models to identify risk events and provide summaries of those events.

9 Claims, 16 Drawing Sheets

(51) Int. Cl.
  *G06F 40/40* (2020.01)
  *G06F 40/284* (2020.01)
  *G06F 40/237* (2020.01)

(56) References Cited

U.S. PATENT DOCUMENTS

| | | | |
|---|---|---|---|
| 2013/0103749 A1* | 4/2013 | Werth | G06F 9/453 709/203 |
| 2014/0120864 A1* | 5/2014 | Manolarakis | G06Q 30/0251 455/405 |
| 2014/0289356 A1* | 9/2014 | Imamura | H04W 4/80 709/213 |
| 2018/0007205 A1* | 1/2018 | Klein | H04L 67/42 |
| 2018/0218374 A1* | 8/2018 | Shah | G06Q 30/016 |

* cited by examiner

Table 1. $V^T$ matrix $V^T$ matrix (r=2)

| | Scn0 | Scn1 | Scn2 |
|---|---|---|---|
| Con0 | 0.457 | 0.228 | 0.510 |
| Con1 | -0.770 | 0.037 | 0.637 |

MACHINE NATURAL LANGUAGE PROCESSING FOR SUMMARIZATION AND SENTIMENT ANALYSIS

CROSS-REFERENCE TO RELATED APPLICATIONS

The present application claims all benefit including priority to U.S. Provisional Patent Application 62/669,488, filed May 10, 2018, and entitled: "MACHINE NATURAL LANGUAGE PROCESSING FOR SUMMARIZATION AND SENTIMENT ANALYSIS", and to U.S. Provisional Application No. 62/669,484, entitled TECHNOLOGY INCIDENT MANAGEMENT PLATFORM, dated 10 May 2018; the entireties of which is hereby incorporated by reference.

FIELD

Aspects of the present disclosure generally relate to the field of natural language processing, and particularly, embodiments of the present disclosure related to systems and methods for a machine natural language processing architecture for providing virtual agents.

INTRODUCTION

Embodiments described herein relate to natural language processing which is a field of computer science and artificial intelligence for natural language understanding, speech recognition, natural-language generation, and so on. A virtual agent may refer to computing components configured to automatically converse using text, speech, or a combination of output, based on natural language processing.

SUMMARY

In accordance with an aspect, there is provided an agent platform for incident related communication with a processor and a memory storing machine executable instructions to configure the processor to: process text fields of IT incident tickets to update a knowledge base for a natural language processor and machine learning; receive a tuple or sequence of elements based on a parsed user query; and trigger interactions at a virtual agent by processing on the tuple or the sequence of elements using the natural language processor.

In some embodiments, the virtual agent is integrated with a chatroom to receive user queries from a plurality of users.

In some embodiments, the processor is further configured to distinguish user queries between the plurality of users.

In some embodiments, the processor is further configured to receive a user query and parse the user query to generate the parsed user query.

In some embodiments, the processor is further configured to trigger the display of a search bar for the virtual agent to receive the user query.

In some embodiments, the tuple or the sequence of elements indicates an IT incident and the processor is further configured to generate a prescriptive solution for the IT incident using the natural language processor and a prescriptive model.

In some embodiments, the tuple or sequence of elements relates to a request for a collection of text data and the processor is further configured to generate a report summary of the collection of text data.

In some embodiments, the processor is further configured to receive summary parameters to limit the report summary to a number of sentences or words.

In some embodiments, the processor is further configured to generate the report summary by computationally summarizing the collection of text data to extract concepts using the natural language processor.

In some embodiments, the processor is further configured to generate the report summary using a latent semantic process.

In some embodiments, the processor is further configured to generate the report summary using the latent semantic process by tokenizing the collection of text data, removing stop words, perform term frequency inverse document frequency on all sentences of the collection of text data to generate a frequency matrix, transpose the frequency matrix, perform singular value decomposition on the frequency matrix, determine concepts, select sentences that represent the concepts, and generate the report summary using the selected sentences.

In some embodiments, the processor is further configured to generate the report summary using a keyword rank process.

In some embodiments, the processor is further configured to generate the report summary using the latent semantic process by tokenizing the collection of text data, removing stop words, stem words to create a stemmed word index, count the frequency of the stemmed words, sort the frequencies, rank each sentence based on keywords in contains, select sentences based on the ranked sentences, and generate the report summary using the selected sentences.

In some embodiments, the processor is further configured to generate visual elements for term-frequency to highlight top terms that are contained with the collection of text data, the visual elements to be part of an interface for display at a display device.

In some embodiments, the processor is configured to implement a sentiment process on the tuple or the sequence of elements to compute a sentiment score for the tuple or the sequence of elements using the natural language processor.

In some embodiments, the processor is configured to implement the sentiment process by tokenizing the tuple or the sequence of elements, import positive and negative word dictionaries, score each tuple and element based a number of positive or negative words contained therein.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DETAILED DESCRIPTION

Large enterprises often rely on large scale computing systems to catalogue queries and requests from employees and/or customers. Processing these kind of requests is time-consuming, and resource intensive. There can be substantial overlap between requests, for example, as numerous requests may be submitted by different people in relation to a same problem. Historical requests may be stockpiled for analysis to identify potential solutions that were useful to resolve prior requests.

Figure 16:
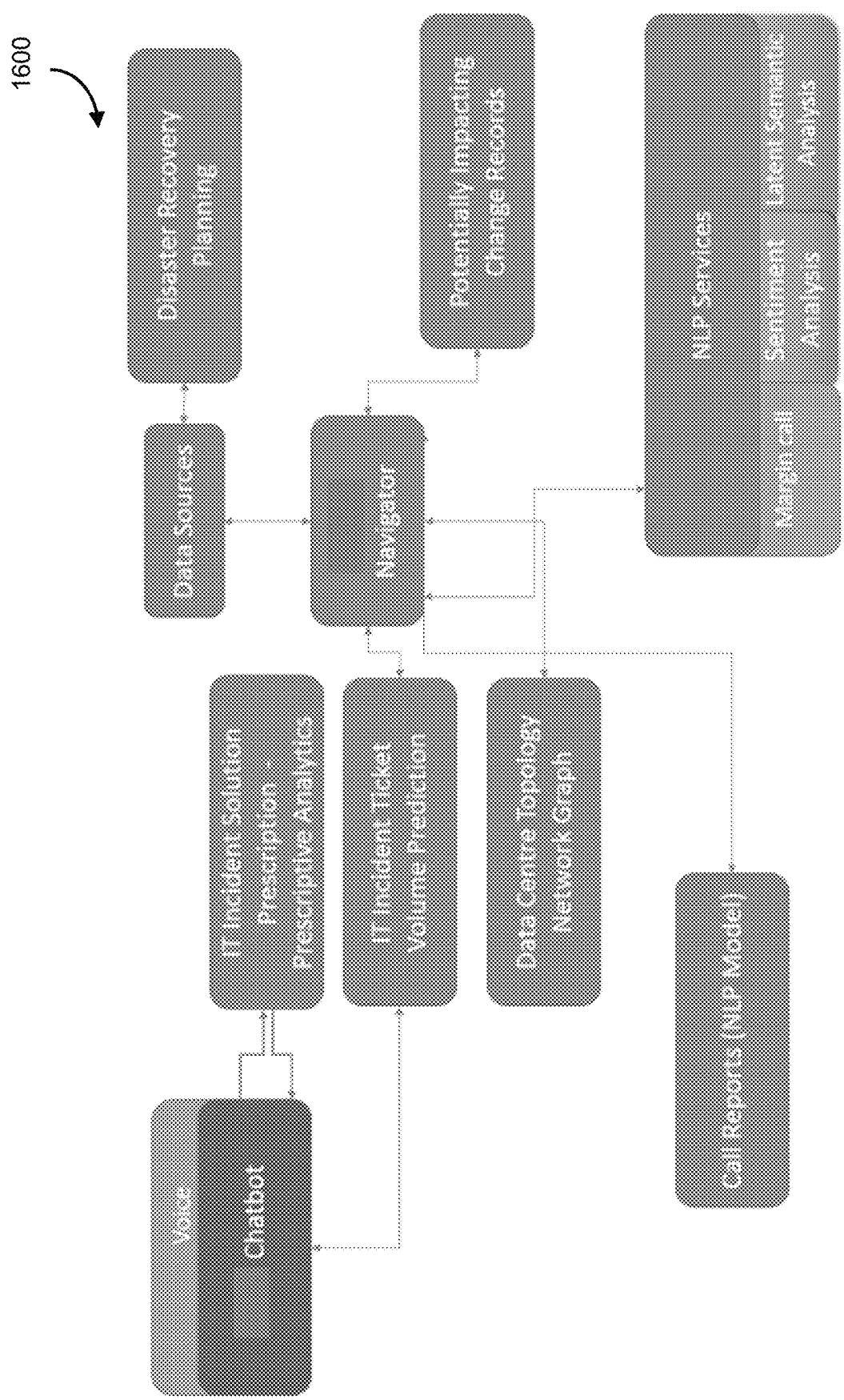
FIG. 16 is a block diagram showing aspects of an example computing system including natural language processing components.

FIG. 16 is a block diagram showing aspects of an example computing system including natural language processing components and their interactions. Embodiments of methods, systems, and apparatus are described through reference to the drawings.

Embodiments described herein relate to natural language processing, including natural language understanding, speech recognition, natural-language generation, and so on. Embodiments described herein relate to virtual agent may refer to computing components configured to automatically converse using text, speech, or a combination of output, based on natural language processing.

Figure 1:
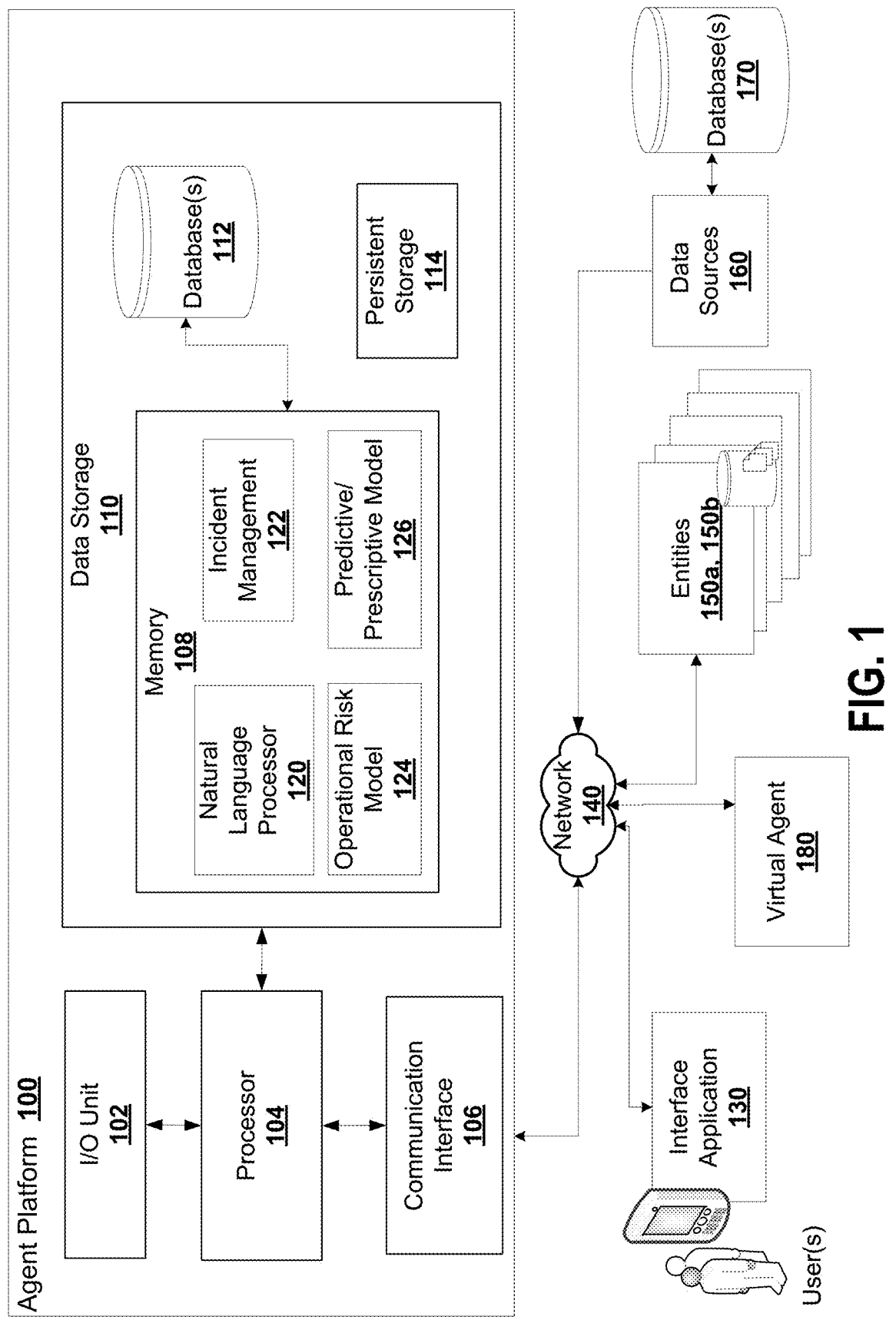
FIG. 1 is a schematic diagram of an example agent platform according to some embodiments.

FIG. 1 is a schematic diagram of an example agent platform 100. The platform 100 can include an I/O Unit 102, a processor 104, communication interface 106, and data storage 110. The processor 104 can execute instructions in memory 108 to implement aspects of processes described herein. The processor 104 can execute instructions in memory 108 to configure natural language processor 120, incident management 122, operational risk model 124, predictive/prescriptive models 126, and other functions described herein. In some embodiments, the platform 100 can include one or more computers, processors, data storage devices, communication systems, and/or the like. In some embodiments, aspects of the platform can be configured by software or other machine instructions to perform one or more aspects of the processes and systems described herein.

The platform 100 connects to virtual agent 180, interface application 130, entities 150, and data sources 160 (with databases 170) using network 140. Entities 150 can interact with the platform 100 to provide input data and receive output data. Network 140 (or multiple networks) is capable of carrying data and can involve wired connections, wireless connections, or a combination thereof. Network 140 may involve different network communication technologies, standards and protocols, for example. The interface application 130 can be installed on user device to display an interface of visual elements that can represent security alerts and chains of events.

The agent platform 100 can receive a large amount of data relating to Information Technology (IT) incidents, security events, change requests, and so on, from different entities 150 (e.g. network entities, network endpoints). The agent platform 100 can process the data to generate summary reports, risk profiles, regulatory issues, and so on, in response to inquiries received at virtual agent 180 using natural language processor 120.

The agent platform 100 implement virtual agent 180 as an interactive and real-time medium is to provide more valuable user experience with Artificial Intelligence (AI) capabilities. The agent platform 100 can be part of an enterprise communication and content sharing platform with persistency and end to end encryption messaging.

The virtual agent 180 (chat bot) that can interact with the communication platform users. The virtual agent 180 (chat bot) can provide a flexible user experience with cognitive natural language interaction, option menu interaction, and broadcast rooms, for example. In some embodiments, the system can provide a three less-coupled layer model including a frontend layer, a cognitive backend layer, and a database processing layer. In some embodiments, the layers can be separate software components executed by one or more processors in the system.

In some embodiments, the system is configured to generate signals to communicate events such as incidents to relevant groups based on their natural language processing or otherwise.

The agent platform 100 can be implemented using an internal framework and a client library for the enterprise communication platform. The internal framework enables the standardization of virtual agents 180 within enterprise communication ecosystem. The client library provides data encryption, security enablement, and intent-based workflow, and some data visualization.

The agent platform 100 can enable incident related communication using a processor 104 and a memory 108 storing machine executable instructions to configure the processor to process text fields of IT incident tickets to update a knowledge base for a natural language processor 120 and machine learning. The processor 104 can receive a user query and parse the user query to generate the parsed user query. The processor 104 can receive a tuple or sequence of elements based on a parsed user query received at virtual agent 180 or interface application 130. The processor 104 can trigger interactions at the virtual agent 180 by processing on the tuple or the sequence of elements using the natural language processor 120.

In some embodiments, the virtual agent 180 is integrated with an chatroom to receive user queries from a plurality of users. The processor 104 can distinguish user queries between the plurality of users. For example, the processor 104 can determine that a first user query is from a first user, that a second user query is from a second user, that a third user query is from the first user, and so on. In some embodiments, the processor 104 is further configured to trigger the display of a search bar for the virtual agent 180 or interface application 130 to receive the user query.

The agent platform 100 can provide users with requested information relating to IT and business domains that can be processed using analyzed AI capabilities such as natural language processor 120. In some embodiments, the tuple or the sequence of elements indicates an IT incident and the processor is further configured to generate a prescriptive solution for the IT incident using the natural language processor and a prescriptive model. For example, the processor 104 can process text fields of IT incident tickets using a natural language processor 120. The processor 104 can update knowledge base for the natural language processor 120 using machine learning, prescriptive models 126, and the processed text fields of the IT incident tokens. The processor 104 can process received the IT incident using the natural language processor 120 and generate a prescriptive solution for the IT incident using the knowledge base and the prescriptive models 126. The processor 104 is configured to output the prescriptive solution to a virtual agent 180.

Figure 7:
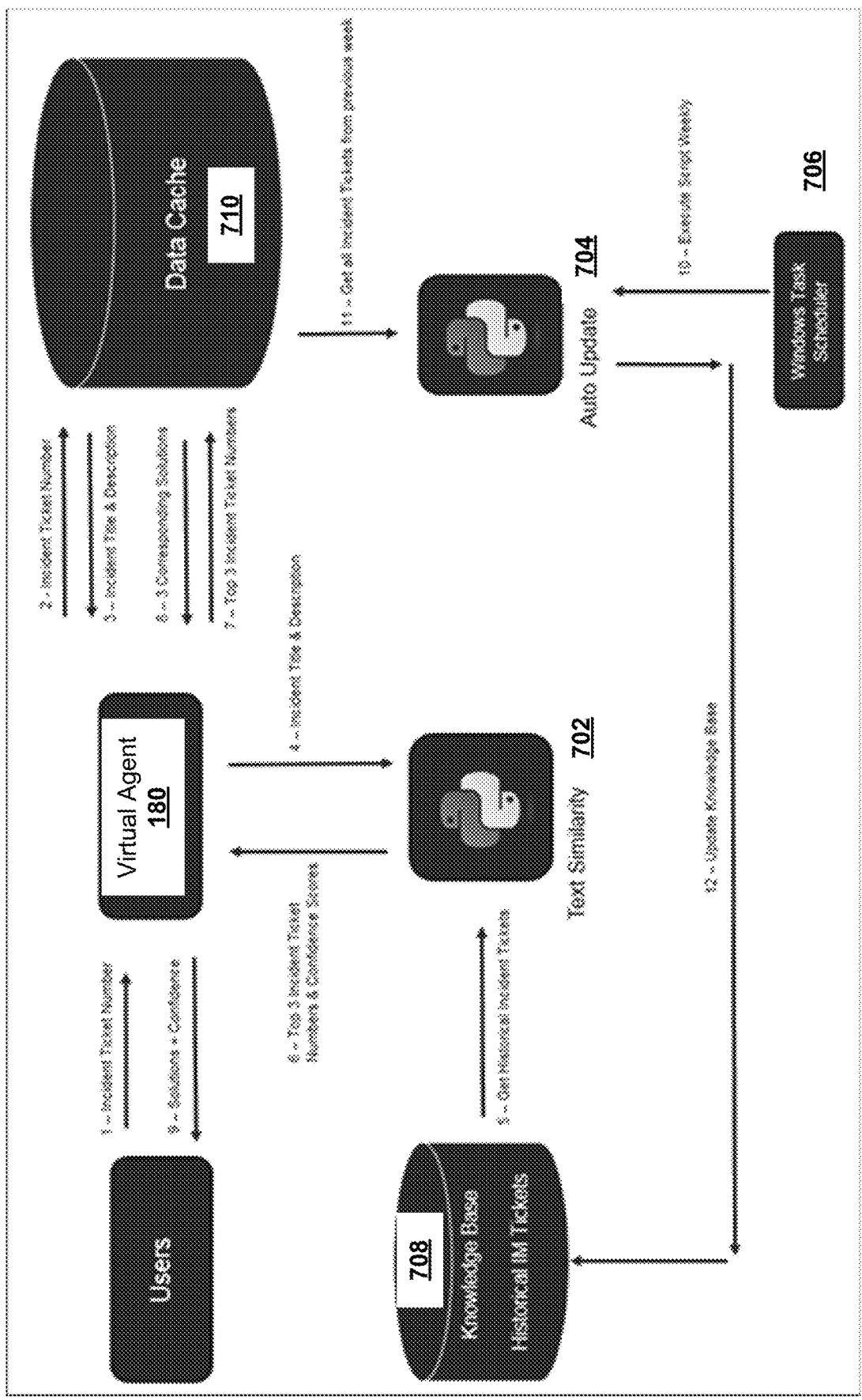
FIG. 7 is a schematic diagram of an example architecture for implementing aspects of natural language processor for incident solution prescription, according to some embodiments.
Figure 8:
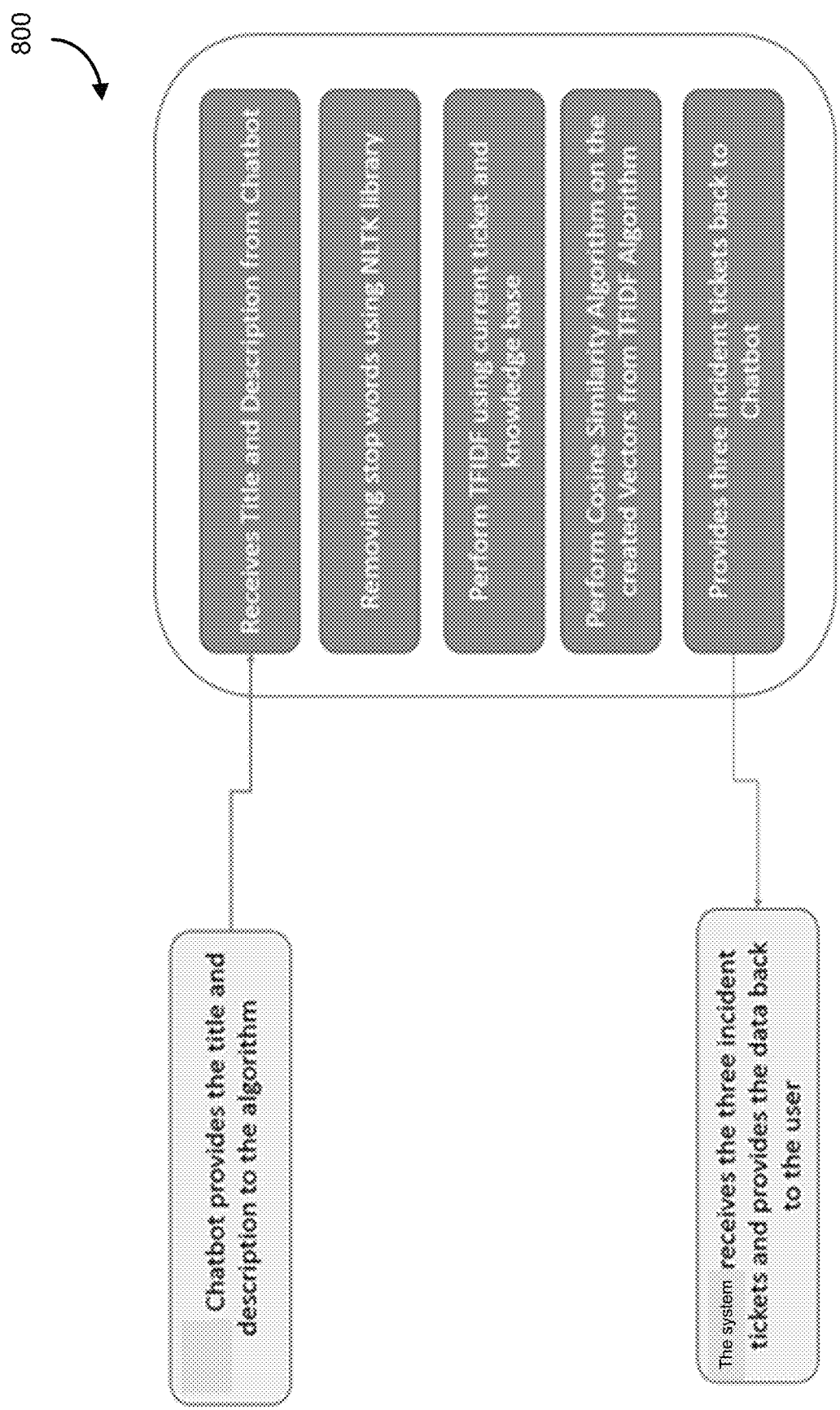
FIG. 8 is a method diagram showing an example method for incident solution prescription, according to some embodiments.
Figure 9:
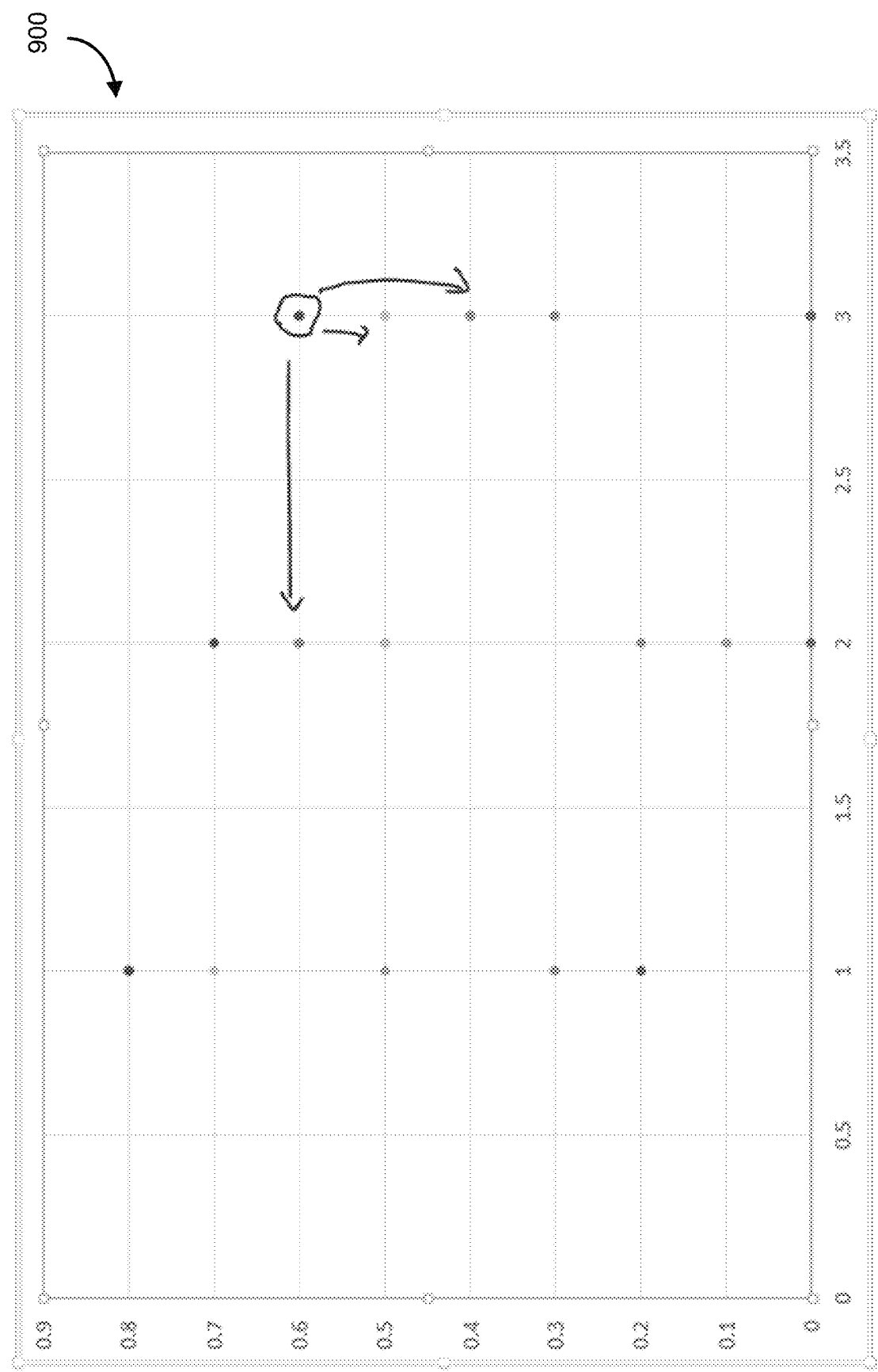
FIG. 9 is a graph showing a constellation of vector representations, according to some embodiments.

FIG. 7 is a schematic diagram of an example architecture for implementing aspects of natural language processor for incident solution prescription, according to some embodiments. FIG. 8 is a method diagram 800 of an example method for incident solution prescription, according to some embodiments. FIG. 9 is a graph 900 showing a constellation of vector representations, according to some embodiments.

The natural language processor 120 can implement automatic expansion of a knowledge base 608 (at data storage 110) to provide a self-learning architecture.

The natural language processor 120 can include instructions or scripts which can include a text similarity process 602 (e.g., Term Frequency and Cosine Similarity) that can involve the following operations: Concatenate Title and Description of new incident ticket; Remove stop words from the title/description; Performs Term Frequency Inverse Document Frequency on Knowledge base 608 (of data storage 110) new Incident with ngram range (1,3); Execute cosine similarity on the new incident title/description against all historical incidents; Sort the output of cosine similarity based on closet matching incident tickets; Determine top 3 (or more) indexes and map them back to their respective incident numbers; Output the incident numbers and confidence scores.

This can be implemented using a prescriptive process developed in a coding language such as python, for example. The reference to "ngram ranges" can relate to the library sklearn (machine learning library) and a parameter that can be enabled inside the tokenization function.

The reference to cosine similarity can relate to a function of the sklearn library. This function calculates the similarity/distance between incident tickets. Once the distance/similarity is calculated, the natural language processor 120 can transform this FIG. into a percentage and provide it to users (e.g. via virtual agent 180) as a type of confidence score. The platform 100 and natural language processor 120 can apply the prescriptive process to the domain of incident ticket management/ticket prescriptions and provide users with a confidence score based on similarity via the virtual agent 180.

In some embodiments, the platform 100 uses historical incident data to predict incident ticket volumes, ticket types. The platform 100 can also process timing data regarding when an incident was reported using a ticket (report or detection time) and when the incident occurs (incident time) to compute incident lag variables. There can be a lag between when a problem occurs and when incident tickets are submitted. For example, one resource may crash, incidents may not occur until later in day when users use an application requiring that resource.

As another example, one of two resources may crash, incidents may not occur until second resource becomes overloaded. The platform 100 can use prediction models 126 to learn and predict lag times. The results may allow for better scheduling of resources (IT personnel, servers/computing resources), or proactive responses to incidents which are indicative of larger problems or incidents which can manifest in larger problems if not addressed. The virtual agent 180 can also be used to submit incidents.

The natural language processor 120 can include instructions or scripts which can include an Auto-Update Process 604 that can involve the following operations.

Task scheduler 606 can be used to execute the script on according to a date/time parameter (e.g. off peak hours). The script can be stored in a data cache (of data storage 110) and acquires all incidents (title and descriptions) from the past week or other period. The auto-update process 604 can concatenate title and description of new incident tickets, and remove stop words (e.g., low value words) from all titles/descriptions, and update the knowledge base 608 with new incident tickets.

Different program libraries can be used to create the instructions for the processes such as: codecs, sklearn, nltk, numpy, operation, and sys, for example.

A sample input could be: "how do I fix inc0304036". The platform 100 may review a corpus of incidents, and revert the output data structure:

Incident[1]: imDescription=RPT012-01005—Critical System Exception—Exception encountered when navigating to exposure management page; imTitle=BL10-RPT012 process failed; imSolution: Issue:RPT012 process failed Resolution: process is restarted and it in running state. Cause: Exception encountered when navigating to exposure management page.

Incident[2]: imDescription=RPT012-01005—Critical System Exception—Exception encountered when navigating to exposure management page VDI: ZJ84943Z; imTitle=BL10-RPT012 critical exception encountered! imSolution: Resolved by restarting the process.

Incident[3]: imDescription=RPT012-01005—Critical System Exception—Exception encountered when navigating to exposure management page; imTitle=BL10-RPT012 Critical System Exception; imSolution: RPT012 process was rerun and completed unsuccessfully.

In this example, in an embodiment, the output data structure could be used to automatically invoke or initiate a data process for causing a process restart (e.g., the running of a shell script to stop and restart the process).

In some embodiments, a visual characteristic of the first textual graphical element, the second textual graphical element, or the third textual graphical element corresponding to each potential solution is modified based on the cosine similarity score corresponding to the potential solution.

The visual characteristic is selected from a group consisting of: font size, font color, background color, and opacity level. For example, visual characteristics can be modified to emphasize or otherwise distinguish between potential solutions to represent differences in cosine similarity scores or confidence scores.

In some embodiments, the agent platform 100 uses WebSockets which may enable real-time fast communication. In some embodiments, the platform enables single sign for users over HTTP session. This HTTP session captures user information of a user who has signed in and transfers this information to the Front end using Web-Socket communication. This may help to make the chatbot more personalized without the need for the user to put his information to sign in.

In some embodiments, the agent platform 100 has a three layer architecture.

Frontend layer: (e.g. React Framework/Javascript)

Database processing/backend layer (e.g. Springboot Framework/Java)

Cognitive data processing layer/Compute Engine: (e.g. Python).

In some embodiments, each layer is defined by software instructions written a different program language. In some embodiments, each layer is configured to communicate with a single communication toppled data structure enabling each layer to communicate with each of the other layers without data transformation.

Below is an example standardized communication data structure for communication between the 3 layers.
{"ChatDialogueKey":"index","ChatMessage":"plainString","ChatTable":"[html Table array]"}

For certain requests, the data can flow from Front-end to Cognitive Model and from Cognitive Model back to the Front-end without any data transformation. Each layer has been designed to accept this data format so, all three layers are independent and can be fast in presenting data to the end-user. In some embodiments, all the three layers are written in three different programming language leveraging the strength of each for its own unique capability.

In some embodiments, the virtual agent one provided via a system for natural language processing. In some embodiments, the system includes one or more memories and one or more processors. In some embodiments, the processor is configured to receive via a virtual agent interface, natural language data including a data representation of user-inputted text.

For example, an input can be receive a message via a chat interface, voice or other interface data representing the natural language request "Please provide me a solution for INC0304036".

In some embodiments, the processor is configured for generating, with a frontend data processing layer, a communication tuple including at least one data field containing the data representation of the user-inputted text, and a sequence identifier identifying positioning of the user-inputted text in a series of communications, and communicating the communication tuple to a cognitive data processing layer.

For example, in one embodiments, the frontend data processing layer receives the input from the user interface and passes this string in the ChatMessage key to the Backend in a JSON Message. Based on the example data structure above, this JSON message contains three keys, namely: ChatMessage, ChatTable and ChatDialogueKey.

ChatMessage: The simple string text is put in this object key

ChatTable: The HTML table string is put in this object key

ChatDialogueKey: This is used to determine the sequencing of the message in the frontend.

Example:
{"ChatDialogueKey":"2","ChatMessage":"Please provide me a solution for INC0304036","ChatTable":"[ ]"}

In some embodiments, upon communicating the communication tuple to the backend data processing layer, the frontend data processing layer is configured to generate signals to provide an output, via the virtual agent interface, indicating that a virtual agent is composing a response. For example, in a chat interface, o emulate the behavior of a virtual agent typing, the backend sends a bubble request message to the frontend (e.g. a text bubble with ' . . . '). In some instances, this may distract or mask the perceived time that a user is waiting for the system to process the request.

In some embodiments, the system is configured for parsing, with the cognitive data processing layer, the data representation of the user-inputted text, and upon determining the user-inputted text is indicative of an information technology (IT) incident based on the parsing, identifying an incident identifier and communicating the incident identifier to a database processing layer. For example, the backend can sends this message to the cognitive engine which extracts the intent of the user to find resolution and parses the incident ticket number <INCXXX> from the message. The Cognitive Engine can provides this Incident number back to the Backend to extract all the data for the ticket from Ticket System database.

In some embodiments, upon identification of the incident identifier, the frontend data processing layer is configured to generate signals to output an intermediate message, via the virtual agent interface, indicating that the virtual agent is searching for a solution for the incident. For example, it can sends the below message as soon as it is able to find the ticket in the system.
{"ChatDialogueKey":"4","ChatMessage":"Let me find some solutions for you.","ChatTable":"[ ]"}

In some embodiments, the system is configured for generating, with the database processing layer, an incident data set associated with the incident identifier, the incident data set including a title, description and list of computer symptoms associated with the incident identifier. For example, Backend connects to the ticket database, collects all the meta data for the ticket, title, description, application code, symptoms and passes it back to the cognitive engine running the algorithm.

In some embodiments, the system is configured for performing, with the cognitive data processing layer, a text similarity algorithm with the incident data set to generate an ordered list of closest matching historical IT incidents. In some embodiments, the Cognitive engine, then runs the algorithm from the current incident data and prescribes the incident tickets which had the most common symptoms of the issue. In some embodiments, this process is similar to the process described herein with respect to the prescriptive analytics. In some embodiments, the vectors are modified to additionally include computer symptoms data as part of the computation. For example, the system can identify three incident numbers which are passed back to the backend. In some embodiments, the backend then connects to the ticketing system database, to extract all the information relevant for resolving the issue, like solution steps and resolution steps.

In some embodiments, the system is configured for generating and communicating a solution tuple including a response sequence identifier identifying a position of a response message in the series of communications, and a plurality of closest solution data sets corresponding to highest ranked historical IT incidents in the ordered list of closest matching historical IT incidents. For example, once the data is extracted from the database, it is sent to the frontend in the format as show below.
{"ChatDialogueKey":"6","ChatMessage":" ","ChatTable": "[[{\"imsNumber\":\"INC0304036\",\"imDescription\":\ "RPT012-01005-Critical System Exception-Exception encountered when navigating to Exposure Management page\\n\",\"imTitle\":\"BLI0-RPT012 process failed\",\"imSolution\":\"Issue:RPT012 process failed\\nResolution: process is restarted and it in running state.\\nCause:Exception encountered when navigating to Exposure Management page\",\"imAEmpNumber\":0, \"imAffectedService\":\ "BluePrism Next Gen. Optimization Robot Process Automation-Prod\",\"imArea\":\"Job faileth",\"imOpenTime\":\ "2019-02-04 09:27:00.0\",\"imConfidenceScore\":\ "0.73\"},{\"imsNumber\":\"IM02784170\",\"im Description\":\"RPT012-01005-Critical System Exception-Exception encountered when navigating to Exposure Management page\\n\\nVDl: ZJB4943Z\",\"imTitle\":\"RPT012-Critical Exception Encountered!\",\"imSolution\":\"Resolved by restarting the process\",\"imAEmpNumber\":0, \"imAffectedService\":\"BLI0 BLUEPRISM NEXT GEN. OPTIMIZATION ROBOT PROCESS AUTOMATION-PROD\",\ "imArea\":\"system or application hangs\", \"imOpen Time:\ "\"2018-06-25 13:21:00.0\",\"imConfidence Score:\": \ "0.71\"}, {\"imsNumber\":\"INC0194079\", †"imDescription\":\"RPT012-01005-Critical System Exception-Exception encountered when navigating to Exposure Management page\\n\",\"imTitle\":\"BLI0-RPT012-01005-Critical System Exception \",\"imSolution\":\ "RPT012 process was rerun and completed successfully\",\ "imAEmpNumber\":0,\"imAffectedService\":\"BluePrism Next Gen. Optimization Robot Process Automation-Prod\",\ "imArea\":\"Job failed\",\"imOpenTime:\":\"2019-01-07 08:29:00.0\",\"imConfidenceScore:\":\"0.68\"}]]"

In some embodiments, the system is configured for generating, with the frontend data processing layer, signals for outputting, via the virtual agent interface, the response message including data from the plurality of closest solution data sets at the identified position in the series of communications.

In some embodiments, apart from providing the prescription solutions, the platform can also contents meta information about employees of the organization with their contact details and Critical Distribution lists which may be important to have during High Impact and Priority incidents.

In some embodiments, the platform can provide an automated ticketing tool configured to identify newly submitted IT incident data structures submitted to the system. For example, the platform can include a thread invoked which connects with the Ticketing tool and checks for new incident tickets. In some embodiments, the system can be configured to check periodically such as every 15 minutes.

In some embodiments, the system can categorize each incident ticket based on a group classification (e.g. a tower or logical vertical in an institution). In some embodiments, incident tickets can be classified by application code.

Once a new ticket is found, the system collects all the data from the database and sends to the Cognitive Engine. The Cognitive engine, then runs the algorithm from the current incident data and prescribes the incident tickets which had the most common symptoms of the issue. The three incident numbers are passed back to the backend. The backend then connects to the ticketing system database, to extract all the information relevant for resolving the issue, like solution steps and resolution steps.

In some embodiments, separate rooms are created on the platform for each respective group. The incidents are then feed into those respective rooms with the three prescribed solutions. In some embodiments, this approach can alerts the entire support team about a new incident ticket with the possible solutions that can be applied for each incident ticket.

In some embodiments, when the electronic messaging platform is facilitating a group chat involving a plurality of users and the virtual agent, the frontend data processing layer is configured to communication the tuple including the at least one data field containing the data representation of the user-inputted text corresponding to a group chat message upon determining that the group chat message is intended to be directed at the virtual agent. In some embodiments, the chat interface can be configured to respond to "@" symbol while conversing with dedicated users in a group, and can filter the text for the virtual agent to process, if the text is directed for someone else. In some embodiments, natural language contextual analysis can be used to determine messages directed to the virtual agent.

Figure 10:
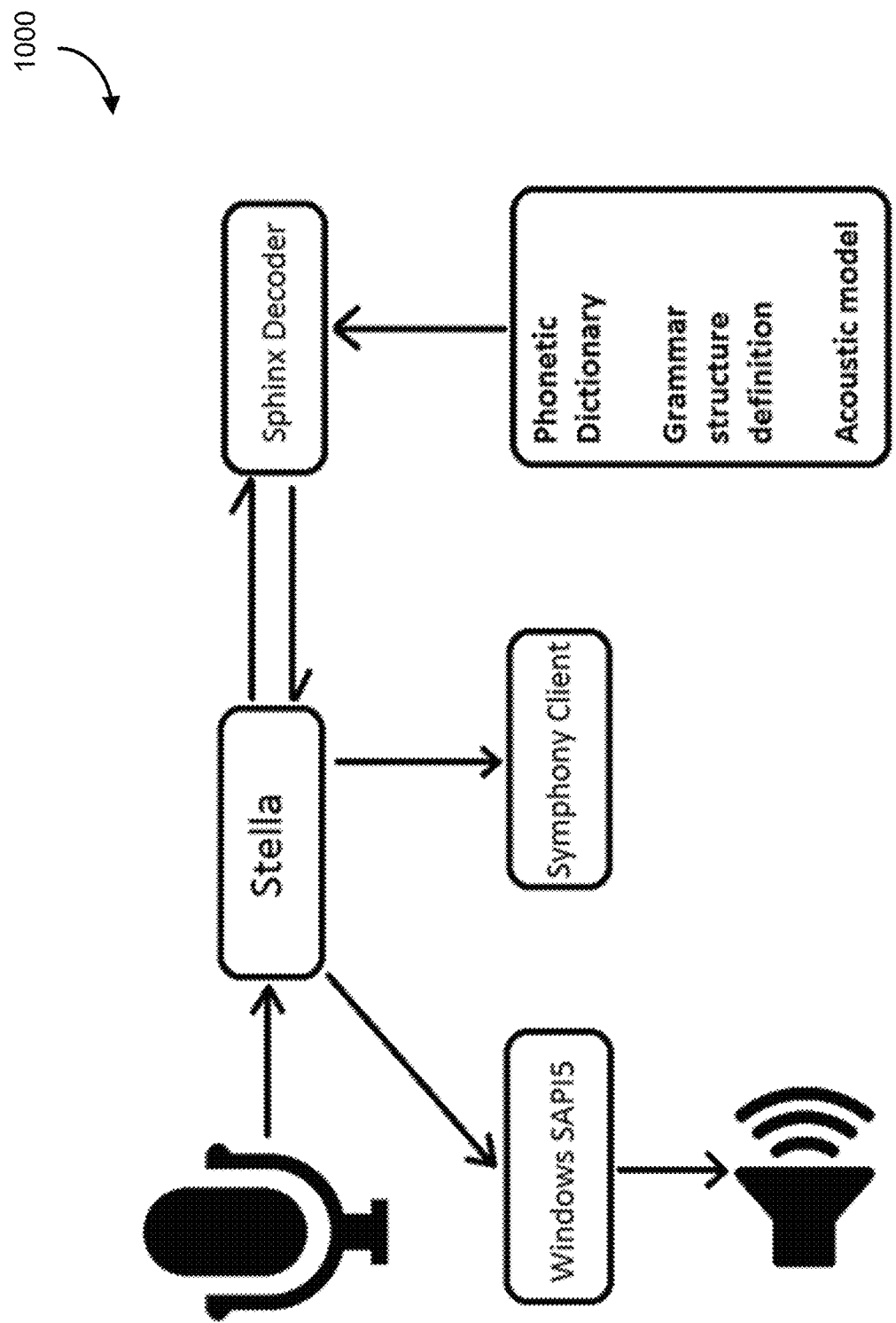
FIG. 10 is a block diagram showing aspects of an example platform having a voice virtual agent interface.

With reference to FIG. 10, in some embodiments, the virtual agent interface can be an audio interface. For example, in some embodiments, the system is configured for receiving audio input data representing the natural language data; and generating the data representation of user-inputted text with a speech-to-text decoder (e.g. a Sphinx decoder). In some embodiments, the decoder translates the audio data into text using phonetic dictionary and acoustic model.

In some embodiments, text outputted via the audio virtual agent interface is generated using a text to speech encoder. (e.g. a Windows SAPI5 text to speech converter).

In some embodiments, the system receives audio input, from user's audio input device and sends input to a Sphinx decoder. In some embodiments, the speech to text software module can include a modified LiveSpeechRecognizer and Microphone class. In some embodiments, the modified class includes a method for closing an audio system line. In some instances, without closing the line, any attempt to stream audio data may fail because the code attempts to open multiple lines of audio streaming. In some embodiments, the modified class calls a closeLine method from the modified Microphone class to close any superfluous audio streaming lines of data. In some embodiments, this can negate a conflict between audio inputs and outputs on an audio interface.

In some embodiments, the system is configured for generating a close line instruction to close an audio stream on an audio interface upon determining the user-inputted text is indicative of an information technology (IT) incident to enable the virtual agent interface to output an audio response on the audio interface.

In some embodiments, Sphinx decoder translates the audio data into text using phonetic dictionary and acoustic model. In some embodiments, a dictionary is custom built to accommodate user names, application codes, application names, and commands/queries specific to Stella via the Sphinx dictionary builder. In some embodiments, a Sphinx acoustic model utilizes grammar file which must be configured to sort audio input to recognize only commands specific to Stella and ignore redundant noise interference.

In some embodiments, output text is parsed by Stella's Cognitive Message Processor.

In some embodiments, the system is coded to automatically listen for voice activation comments (e.g. "Activate Stella Voice") to initiate parsing for commands and queries built into the Sphinx acoustic model's grammar file. In some embodiments, upon receiving fully formed query with relevant query parameters—app code, app name, app custodian name, and specific key words to each query—the query string is passed into the process for processing.

In some embodiments, the requested information is then outputted via Windows SAPI5 text to speech and displayed in the Symphony Client. In some embodiments, a speech script parses string outputted by the Stella Cognitive Message Processor into individual components in order to ensure fluid audio output. In some embodiments, speech script is set to continue with current output audio command in order to handle instances where new output string outputted by the Cognitive Message Processor crashes the speech script if previous output string not completely processed. In some embodiments, a Java method for calling the Visual Basic speech script is included in method for outputting text to Symphony Client to ensure the output is visible on the Symphony Client while the text to speech function reads out the output.

In some embodiments, the voice virtual agent interface is configured to response to enumerated commands in addition to the natural language processes described herein. Some examples are listed below.
ACTIVATE STELLA VOICE/SPEECH TO TEXT—required command to start listening, and to reactivate speech to text after deactivation command
DEACTIVATE STELLA VOICE/SPEECH TO TEXT—stop Stella from attempting to parse speech input; Stella will continue to listen for activate command
   STELLA PRESCRIBE SOLUTION FOR/HOW DO I FIX IM ########
   STELLA TELL ME ABOUT <app code or app name here>
   STELLA SHOW ME [TOP 3] NON COMPLIANT APPLICATIONS/APPS [FOR] <app custodian name here>
   STELLA SHOW ME DR PLANS [FOR] <app custodian name here>
   STELLA SHOW ME TSS [COMPLIANCE] REPORT [FOR] <app code or app name here>
   STELLA SHOW ME [UPCOMING] SLA [FOR] <app custodian name here>
   STELLA SHOW ME CR FOR <app code or app name here>
   STELLA SHOW ME PROBLEM TICKETS [FOR] <app code or app name here>
   STELLA SHOW ME P1 [AND/OR] P2 TICKETS [FOR] <app code or app name here>
   STELLA WHAT IS: AI/A CHATBOT/MACHINE LEARNING/ARTIFICIAL INTELLIGENCE/A DISASTER RECOVERY PLAN/A SERVICE LEVEL AGREEMENT
   STELLA HOW DO YOU LIKE BANK ABC
   STELLA I AM TIRED
   STELLA WHAT DO YOU DO FOR FUN |
   STELLA WHAT IS THE WEATHER LIKE In some embodiments, the tuple or sequence of elements relates to a request for a collection of text data and the processor 104 is further configured to generate a report summary of the collection of text data. The processor 104 can receive summary parameters to limit the report summary to a number of sentences or words. The processor 104 can generate the report summary by computationally summarizing the collection of text data to extract concepts using the natural language processor.

The processor 104 can generate the report summary using a latent semantic process. In some embodiments, the processor 104 is further configured to generate the report summary using the latent semantic process by tokenizing the collection of text data, removing stop words, perform term frequency inverse document frequency on all sentences of the collection of text data to generate a frequency matrix, transpose the frequency matrix, perform singular value decomposition on the frequency matrix, determine concepts, select sentences that represent the concepts, and generate the report summary using the selected sentences.

In some embodiments, the processor 104 can generate the report summary using a keyword rank process. For example, the processor 104 can generate the report summary using the latent semantic process by tokenizing the collection of text data, removing stop words, stem words to create a stemmed word index, count the frequency of the stemmed words, sort the frequencies, rank each sentence based on keywords in contains, select sentences based on the ranked sentences, and generate the report summary using the selected sentences.

In some embodiments, the processor 104 is further configured to generate visual elements for term-frequency to highlight top terms that are contained with the collection of text data, the visual elements to be part of an interface for display at a display device.

In some embodiments, the processor 104 is configured to implement a sentiment process on the tuple or the sequence of elements to compute a sentiment score for the tuple or the sequence of elements using the natural language processor. For example, the processor can implement the sentiment process by tokenizing the tuple or the sequence of elements, import positive and negative word dictionaries, score each tuple and element based a number of positive or negative words contained therein.

The agent platform 100 can be invoked through the enterprise communication platform, virtual agent 180, or through interface application 130 with may be a browser in a Search bar. The agent platform 100 enables cognitive analysis of the questions being asked.

The agent platform 100 can enable cognitive interaction (through natural language processor 120) and Option Menu interaction. The agent platform 100 can receive input from the user, and checks whether it is a menu option. If not, the agent platform 100 triggers cognitive workspace models. The agent platform 100 connects with a Live-Score for on-demand analytics. The agent platform 100, at natural language processor 120, receives a tuple, or a sequence of elements, based on the parsed user input. The agent platform 100 triggers the relative interactions in the virtual agent 180 and presents the response data to the user.

The agent platform 100 interacts or implements a cognitive workspace. The cognitive workspace can receive natural language as an input and using a keyword dictionary maps the users input into 1 of 9 pathways (or another number of pathways). In addition, the cognitive workspace also extracts one or more mentions of an application name, Appcode, or custodian name and pass this information back to natural language processor 120 via a tuple (1-9, Appcode/custodian name). If the tuple is returned without an appcode/custodian name, then the virtual agent 180 can ask the users for this information. If the user forgets to mention a Appcode/custodian name, then the virtual agent 180 can intelligently ask the user for this information, which becomes a multiple communication conversation. For example consider the sample dialogue:
   User: "Are there any DR plans upcoming for renewal?"
   Virtual Agent: "Please enter a Appcode/custodian names for DR plans"
   User: "YWH0"

Virtual Agent: "Provides information regarding DR plans"

The agent platform 100 can implement broadcast rooms for IT Incident Solution Prescription. The agent platform 100 establishes a connection with ITSM data sources 160 to check for new IT incident tickets. The agent platform 100 uses predictive models to run prescriptive process as per IT Incident resolution prescription use case. The agent platform 100 can parse the result and segregate the results based on respective teams. The agent platform 100 can present the team with suggestion on resolving the incidents using the virtual agent 180.

The virtual agent 180 can use Natural Language Processor 120 in the backend and can have the ability to terminate a chat session when asked by user, and the ability to distinguish between multiple user interactions in a group chat by tagging received inquiry data with user identifiers.

The virtual agent 180 can display a search bar for receiving user input or inquiries. The virtual agent 180 can provide detailed responses on the questions being asked as inquiries. The agent platform 100 can analyze all available data through deep learning processes and provide a cognitive human-like response.

For example, a user inquiry may be "tell me all trade blotter rules in GBOI" or "What is the business impact of CMP2 file from Gloss being delayed by an hour?" or "what is the operational risk event predicted for file x being delayed from source system A?".

In a fast-paced industry such as banking and technology, the amount of lengthy articles, regulatory documents, emails, and news articles being published are growing. This increases the need to efficiently consume all the textual information an employee needs to understand. Text analytics is the process of computationally deriving benefit and information from unstructured text.

The platform 100 can implement employee feedback box sentiment analytics using natural language processor 120 to provide sentiment analysis on employee feedback text data. The platform 100 can implement trade book and sales book predictive analytics by applying predictive models 126 two trade book or sales book data using machine learning. The platform 100 can generate visualization of hotspots in application codes caused by changes.

The platform 100 can implement prescriptive analytics. The platform 100 can implement a root cause prescription process using a virtual agent 180 and natural language processor 120. The platform 100 can leverage text mining from incident ticket titles and descriptions to learn from past solutions and predict root cause of future incidents and issues. This can reduce triage time and speed up resolution time to minimize business impact.

The platform 100 can build models to answer questions received at virtual agent 180 output solutions to problems and incidents posed in natural language at virtual agent 180. The platform 100 enables a continuous expansion of the knowledgebase used by models. The platform 100 can implement assignment group recommendation engines. The platform 100 can analyse past activity fields of tickets to understand the ticket processing flow from one assignment group to another the platform 100 can identify bottlenecks assignment groups in the workflow and generate a ticket assignment recommendation to automatically assign tickets to the true related assignment group to save processing time. This can be achieved using network analysis, clustering processes and natural language processor 120.

The platform 100 can aim to prevent business impact resulting from IT system problems or business process issues. Proactive outage prevention and early problem detection can enable faster mean repair time is critical to prevent any business impact.

IT Incident Management data is recorded and tracked through IT incident tickets using an IT Service Management tool, for example, and the ticket data can be provided to the platform 100. These tickets can include data relating to the incident such as title, description, and resolution in addition to the automatically generated metadata.

The agent platform 100 uses natural language processor 120 for a range of text analytics. For example, the natural language processor 120 can summarize text using either Latent Semantic Analysis (LSA) or Keyword Rank Algorithm. The natural language processor 120 can computationally summarize an article/inputted text to extract the main concepts/ideas. See for example, FIG. 5.

In some embodiments, the platform includes at least one memory and at least one processor configured for: receiving natural language data including a data representation of user-inputted text; tokenizing the data representation into a data set of sentences; parsing the data set and removing low relevance words from the sentences to generate a simplified data set; generating a ranking for the sentences based on the simplified data set; and outputting a summary of the user-inputted text based on the sentences having highest ranking scores.

As another example, the natural language processor 120 can generate a term-frequency word Cloud/bar chart. See for example, FIG. 5. The word cloud and the term-frequency bar chart can provide a glimpse into the top key words that are being discussed in the document. The size of the words are determined by the amount of times the word appears in the document.

As a further example, the agent platform 100 uses natural language processor 120 for sentiment analysis. Sentiment analysis is the process of computationally identifying the attitude/sentiment of a given text. The natural language processor 120 can classify sentences as either very negative, negative, neutral, positive, or very positive. The sentiment score can be determined by aggregating scores based on a ~7000 word positive and negative word dictionaries.

In some embodiments, the natural language processor 120 can summarize text using summarization with LSA using the following operations. The natural language processor 120 can receive text data or an article from interface application 130, entities 150 or data sources 160, for example. The natural language processor 120 can tokenize the text into individual sentences. The natural language processor 120 can remove stop words from each sentence. The natural language processor 120 can perform term frequency inverse document frequency (tf-idf) on all sentences. The natural language processor 120 can transpose the matrix generated by tf-idf. The natural language processor 120 can perform singular value decomposition (svd) on the matrix. The natural language processor 120 can determine the most important concept from VT and select 3 sentences that best represent that concept. The natural language processor 120 can determine the second most important concept from VT and selected 2 sentences that best represent that concept. The natural language processor 120 can select one sentence from the next concept (repeat until user defined number of sentences is reached).

Singular Value Decomposition (SVD): singular value decomposition is a mathematical method International Journal of Computer Applications (0975-8887) Volume 81-No. 11, November 2013 41 applied to the input matrix. SVD is used to identify patterns in the relationships between the terms and sentences. SVD as a mathematical equation can be represented as an m×n matrix (M). M is formed as M=U Σ VT (1) Where U is an m×n matrix which represents the original rows as vectors of extracted values, Σ is an n×n rectangular diagonal matrix with nonnegative real numbers on the diagonal representing the scaling values, and VT (the conjugate transpose of V) is an n×n real or complex unitary matrix which represents the original columns as vectors of extracted values. [Reference: Text *Summarization within the Latent Semantic Analysis Framework: Comparative Study, International Journal of Computer Applications* (0975-8887)]

The natural language processor 120 can use the following example Libraries: codecs, numpy, nltk, sklearn, operator, sys.

Figure 11:
FIG. 11 is an example concept matrix.

FIG. 11 shows is a representation of the $V^T$ which is obtained from SVD algorithm described above. As shown in the FIG. 11, in some embodiments, the system would select three sentences from Con0 which represents the main concept, two sentences from Concept 2 which is represented by Con1 and 1 sentence from the remaining concepts. In some situations, experimentation has shown that this combination/ratio yielded the most representative summaries.

In some embodiments, generating the ranking for the sentences comprises: traversing with the at least one processor the simplified data set to generate a stemmed data set including an index of stemmed words in the simplified data set and their frequency; identifying a set of most frequency occurring stemmed words and ranking the sentences based on a number of words in the sentence appearing in the set of most frequency occurring stemmed words.

In some embodiments, the natural language processor 120 can summarize text using summarization with Keywords using the following operations. The natural language processor 120 can receive text data or an article from interface application 130, entities 150 or data sources 160, for example. The natural language processor 120 can tokenize text into individual sentences. The natural language processor 120 can remove stop words from each sentence. The natural language processor 120 can stem words and create stemmed word index. The natural language processor 120 can count the frequency of all stemmed words. The natural language processor 120 can sort the frequencies in descending order. The natural language processor 120 can rank each sentence based on the number of keywords it contains (e.g. focusing on only the top 10 keywords). The natural language processor 120 can select the number of sentences to output (user defined). The natural language processor 120 can output the sentences in the original order they were inputted in. The natural language processor 120 can use the following example Libraries: codecs, nltk, operator, sys.

Figure 12:
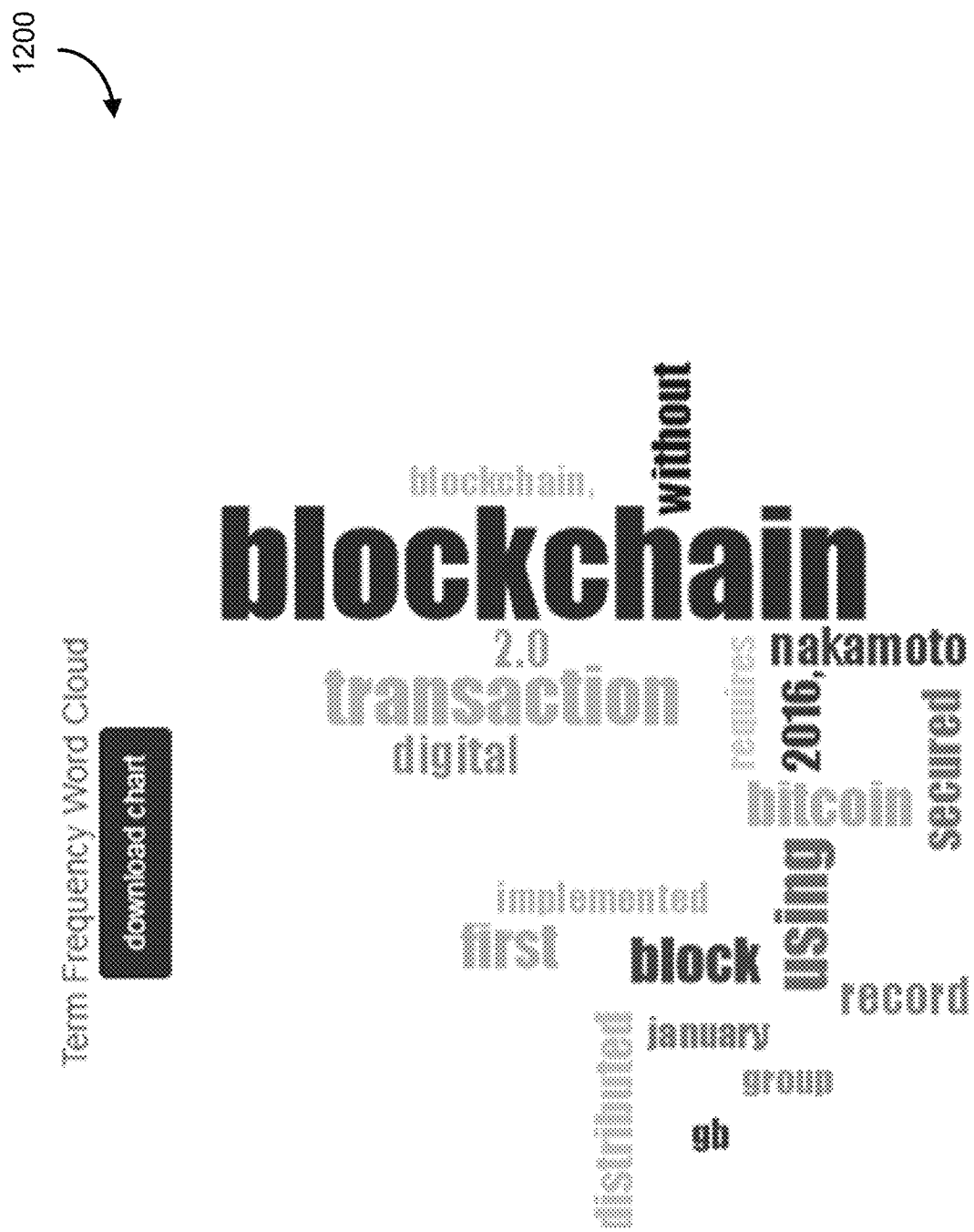
FIG. 12 shows an example term frequency word cloud visualization for an example article.
Figure 13:
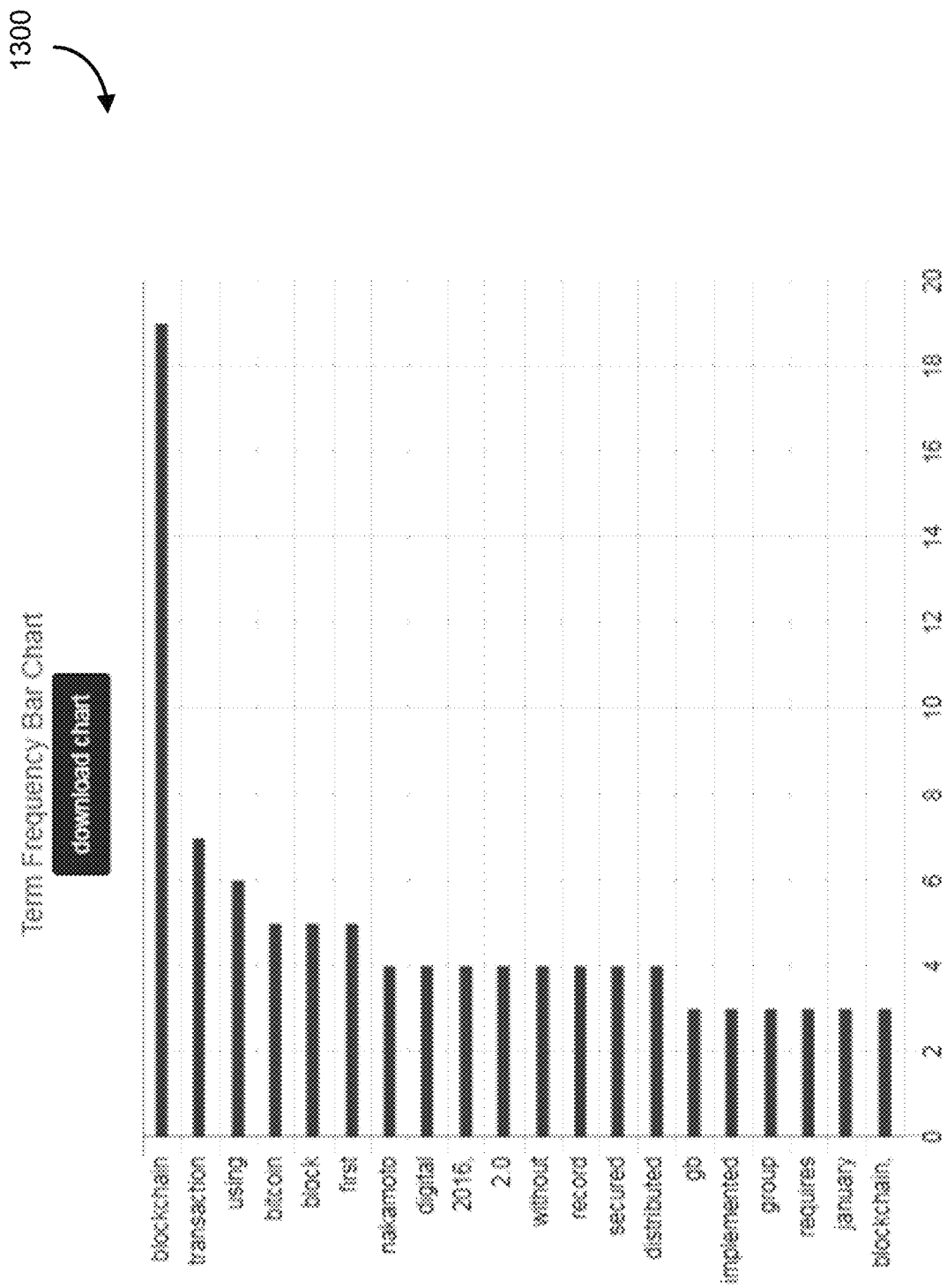
FIG. 13 shows an example term frequency bar chart for an example article.
Figure 14:
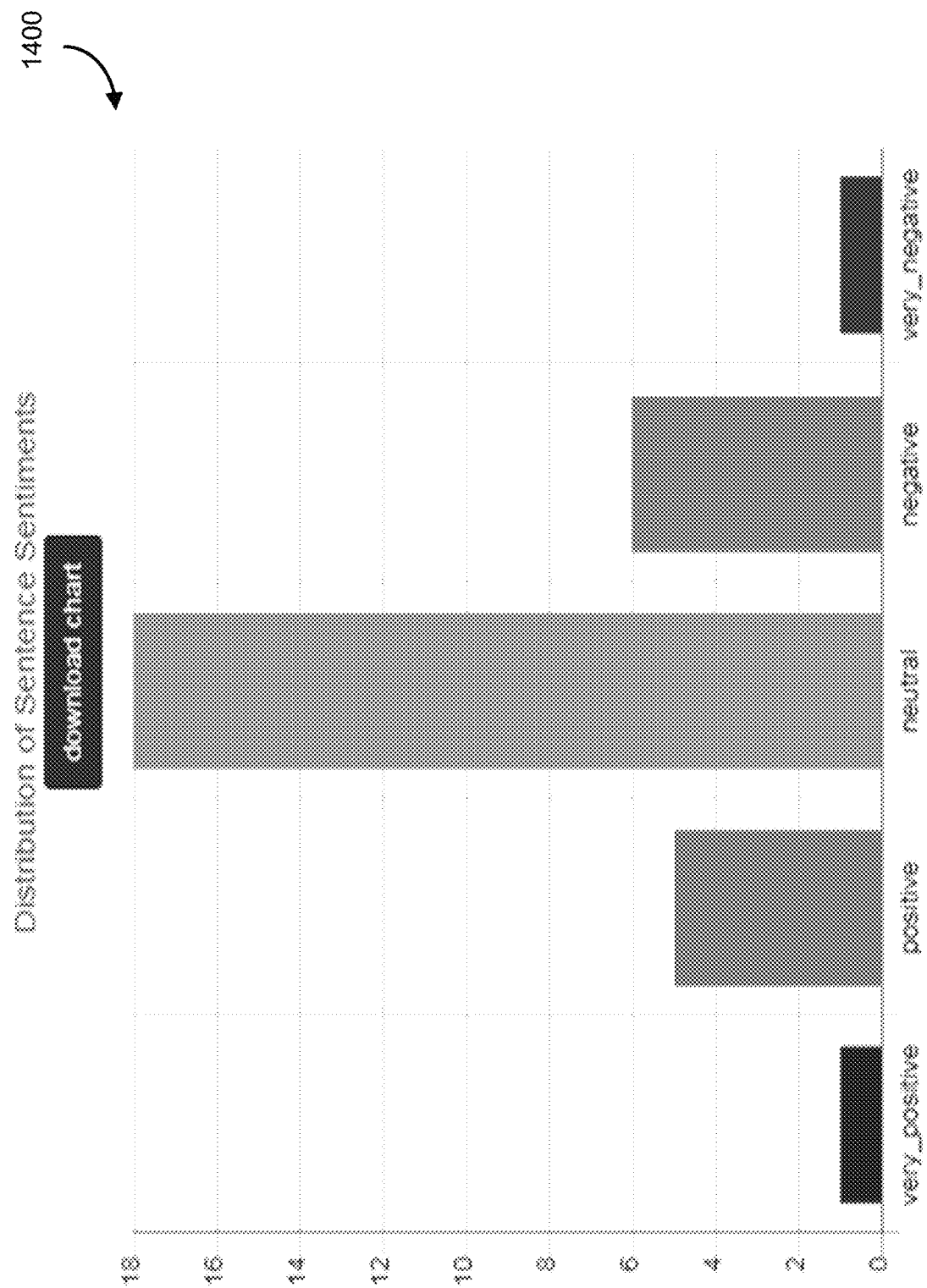
FIG. 14 shows an example distribution of sentence sentiments.

FIG. 12 shows an example term frequency word cloud visualization for the example article below. FIG. 13 shows an example term frequency bar chart for the example article below.

Input Article:

"A blockchain, originally block chain, is a continuously growing list of records, called blocks, which are linked and secured using cryptography. Each block typically contains a cryptographic hash of the previous block, a timestamp and transaction data. By design, a blockchain is inherently resistant to modification of the data. It is "an open, distributed ledger that can record transactions between two parties efficiently and in a verifiable and permanent way". For use as a distributed ledger, a blockchain is typically managed by a peer-to-peer network collectively adhering to a protocol for inter-node communication and validating new blocks. Once recorded, the data in any given block cannot be altered retroactively without the alteration of all subsequent blocks, which requires collusion of the network majority.

Blockchains are secure by design and exemplify a distributed computing system with high Byzantine fault tolerance. Decentralized consensus has therefore been achieved with a blockchain. This makes blockchains potentially suitable for the recording of events, medical records, and other records management activities, such as identity management, transaction processing, documenting provenance, food traceability or voting.

Blockchain was invented by Satoshi Nakamoto in 2008 for use in the cryptocurrency bitcoin, as its public transaction ledger. The invention of the blockchain for bitcoin made it the first digital currency to solve the double-spending problem without the need of a trusted authority or central server. The bitcoin design has been the inspiration for other applications.

The first work on a cryptographically secured chain of blocks was described in 1991 by Stuart Haber and W. Scott Stornetta. In 1992, Bayer, Haber and Stornetta incorporated Merkle trees to the design, which improved its efficiency by allowing several documents to be collected into one block.

The first blockchain was conceptualized by a person (or group of people) known as Satoshi Nakamoto in 2008. It was implemented the following year by Nakamoto as a core component of the cryptocurrency bitcoin, where it serves as the public ledger for all transactions on the network. Through the use of a blockchain, bitcoin became the first digital currency to solve the double spending problem without requiring a trusted authority and has been the inspiration for many additional applications.

In August 2014, the bitcoin blockchain file size, containing records of all transactions that have occurred on the network, reached 20 GB (gigabytes).[19] In January 2015, the size had grown to almost 30 GB, and from January 2016 to January 2017, the bitcoin blockchain grew from 50 GB to 100 GB in size.

The words block and chain were used separately in Satoshi Nakamoto's original paper, but were eventually popularized as a single word, blockchain, by 2016. The term blockchain 2.0 refers to new applications of the distributed blockchain database, first emerging in 2014. The Economist described one implementation of this second-generation programmable blockchain as coming with "a programming language that allows users to write more sophisticated smart contracts, thus creating invoices that pay themselves when a shipment arrives or share certificates which automatically send their owners dividends if profits reach a certain level." Blockchain 2.0 technologies go beyond transactions and enable "exchange of value without powerful intermediaries acting as arbiters of money and information." They are expected to enable excluded people to enter the global economy, protect the privacy of participants, allow people to "monetize their own information," and provide the capability to ensure creators are compensated for their intellectual property. Second-generation blockchain technology makes it possible to store an individual's "persistent digital ID and persona" and provides an avenue to help solve the problem of social inequality by "potentially changing the way wealth is distributed". As of 2016, blockchain 2.0 implementations continue to require an off-chain oracle to access any "external data or events based on time or market conditions [that need] to interact with the blockchain."

In 2016, the central securities depository of the Russian Federation (NSD) announced a pilot project, based on the Nxt blockchain 2.0 platform, that would explore the use of blockchain-based automated voting systems. IBM opened a blockchain innovation research center in Singapore in July 2016. A working group for the World Economic Forum met in November 2016 to discuss the development of governance models related to blockchain. According to Accenture, an application of the diffusion of innovations theory suggests that blockchains attained a 13.5% adoption rate within financial services in 2016, therefore reaching the early adopters phase. Industry trade groups joined to create the Global Blockchain Forum in 2016, an initiative of the Chamber of Digital Commerce."

Output:

"The invention of the blockchain for bitcoin made it the first digital currency to solve the double-spending problem without the need of a trusted authority or central server.

The bitcoin design has been the inspiration for other applications.

Through the use of a blockchain, bitcoin became the first digital currency to solve the double spending problem without requiring a trusted authority and has been the inspiration for many additional applications.

Blockchain was invented by Satoshi Nakamoto in 2008 for use in the cryptocurrency bitcoin, as its public transaction ledger.

The first blockchain was conceptualized by a person (or group of people) known as Satoshi Nakamoto in 2008.

A blockchain, originally block chain, is a continuously growing list of records, called blocks, which are linked and secured using cryptography."

The natural language processor 120 can implement sentiment analysis using the following example operations. The natural language processor 120 can receive text data or an article from interface application 130, entities 150 or data sources 160, for example. The natural language processor 120 can tokenize text into individual sentences. The natural language processor 120 can import positive and negative word dictionaries. The natural language processor 120 can score each sentence based on the number of positive/negative words it contains (+1 for each positive word and −1 for each negative word). The natural language processor 120 can classify the sentences based on aggregated score (for example: +4 or greater=Very Positive, +2 or greater=Positive, 0=Neutral, −2 or less=Negative, −4 or less=Very Negative). The natural language processor 120 can use the following example Libraries: codecs, nltk.

Figure 15:
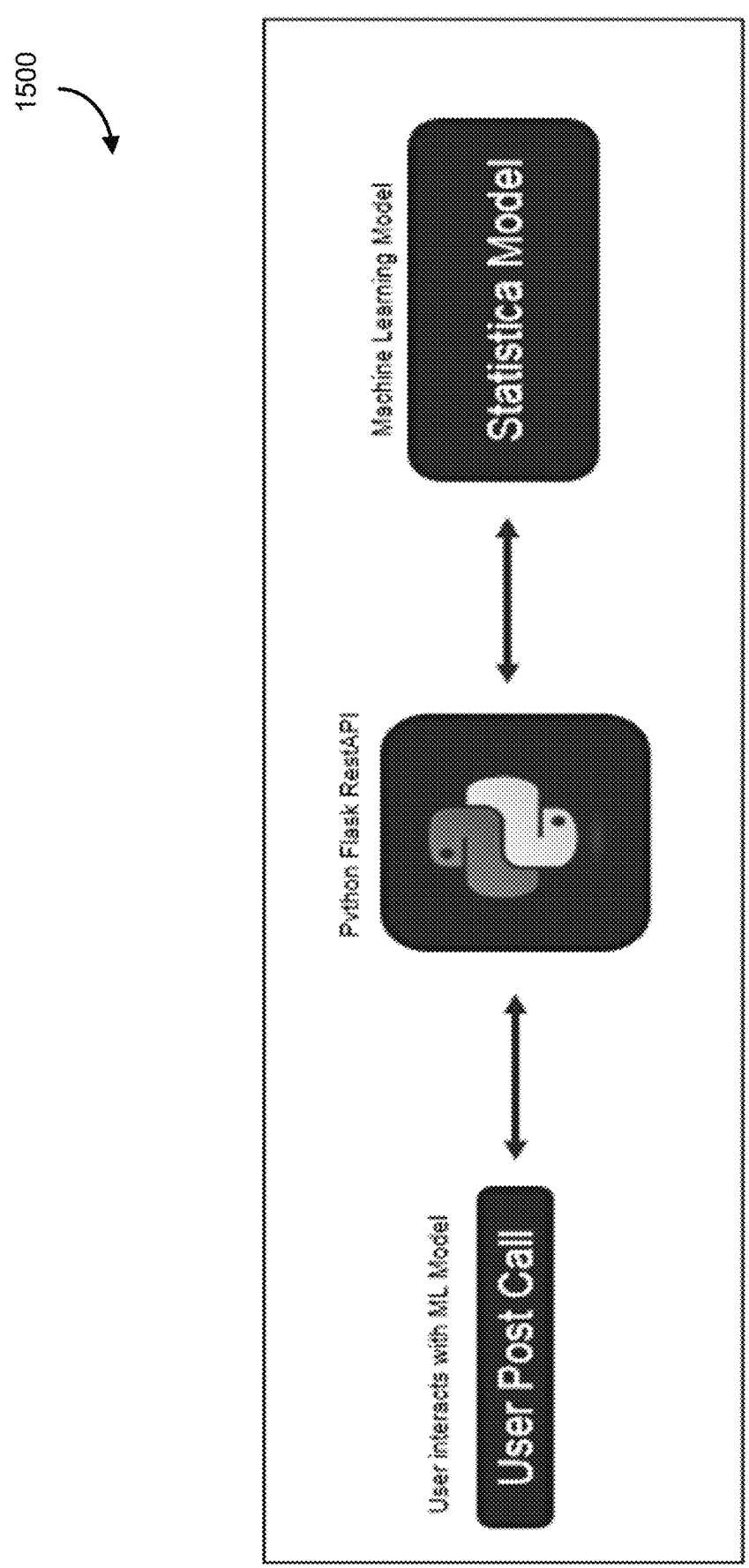
FIG. 15 shows an example platform for interaction classification.

FIG. 15 shows an example distribution of sentence sentiments.

The platform 100 can enable communications using virtual agent 180 relating to IT incident management and can involve predictive analytics, prescriptive analytics, and descriptive analytics. The platform 100 can enable IT incident solution prediction using prescriptive models 126 and natural language processor 120 and use virtual agent 180 to exchange queries and responses. The platform 100 can enable IT incident ticket volume prediction using predictive models 126 and natural language processor 120. The platform 100 can generate visual elements for display at an interactive interface application 130 that represents data centre topology network graphs using descriptive models. The virtual agent 180 can translate data relating to the visualizations into text data.

The incident management unit 122 process data relating to an organization's technological infrastructure using predictive/prescriptive models 126 and event detection 122 to generate predictions/prescriptions for incidents and system outages or degradation of infrastructure and automatically prescribe solutions for incident predictions for delivery using virtual agent 180. The incident management unit 122 uses machine learning processes to identify hidden relationships or patterns connecting different data points and trigger execution on future similar scenarios to generate alerts for virtual agent. The platform 100 can enable both business and IT users to augment human capabilities. The platform 100 uses operational risk models 124 to predict operational risk events that could cause impact from a financial, reputational, operational or regulatory perspective. The platform 100 models predictive models 126 and event detection 122 to detect user access anomalies or intrusion detection for infrastructure resources.

The incident management unit 122 implements machine learning processes to generate predictions of the most likely outcomes in any IT or business scenario and natural language processor 120 to understand and process user queries at virtual agent 180.

The incident management unit 122 can process text fields of IT incident tickets using a natural language processor 120. The incident management unit 122 updates knowledge base for the natural language processor 120 using machine learning, prescriptive models 126, and the processed text fields of the IT incident tokens. The incident management unit 122 can process a new IT incident token using the natural language processor and generate a prescriptive solution for the new IT incident token using the knowledge base and the prescriptive models 126.

In some embodiments, the natural language processor 120 processes the new IT incident token using a text similarity process to compare the new IT incident token with the knowledge based updated with the processed text fields of the IT incident tokens. In some embodiments, the processor 104 is configured to generate a confidence score using the text similarity process. In some embodiments, the processor 104 is configured to output the prescriptive solution for display at an interface application 130 with a visual element indicating the prescriptive solution. In some embodiments, the processor 104 is configured to output the prescriptive solution to the virtual agent 180.

In some embodiments, the incident management unit 122 enables incident ticket volume prediction and can process text fields of IT incident tickets for an application using the natural language processor 120. The IT incident tickets have an application code corresponding to the application. The incident management unit 122 can update a prediction model 126 using machine learning and the processed text fields of the IT incident tokens. The incident management unit 122 can generate a volume prediction for incidents using the prediction model 126. The incident management unit 122 can update the operational risk model 124 using the processed text fields of the IT incident tokens and generate an operational risk prediction using the operation risk model 124. In some embodiments, the incident management unit 122 is configured to detect user access anomalies or intrusions using event detection. In some embodiments, the processor 104 is configured to process the text fields of IT incident tickets by removing outliers. In some embodiments, the prediction model 126 is a neural network regression model. The prediction can be output at virtual agent 180.

In some embodiments, the processor 104 is configured to process change management records using the natural language processor 120 and, link the change management records to the application topology graph data structure. The processor 104 can update the visual elements to indicate the change management records. In some embodiments, the processor 104 is configured to determine that a first change management record relates to a first application and a second application. The graph generator 125 generates the application topology graph data structure to indicate a link between the first application and the second application. Other features are described herein.

The incident management unit 122 uses machine learning processes to generate prediction models 126 of the most likely outcomes in IT or business scenarios. The platform can augment human capability, boost productivity and performance, and reduce cost and risk. The platform 100 can use a combination of analytic capabilities at different stages in the incident management process to predict incidents and prescribe solutions effectively the platform 100 different models 124, 126 that can be predictive models 126, prescriptive models, and descriptive models.

The incident management unit 122 can implement predictive analytics. The platform 100 can implement incident volume prediction. The platform can leverage time series analysis of historical incident tickets using natural language processor 120 to predict a volume of tickets for proactive application support planning. The platform 100 can enable proactive outage prevention and early problem detection to enable faster repair time and minimize business impact. For example, the platform 100 can use a predictive model 126 based on neural network regression data structures for example. The platform 100 can implement outage predictors and indicators at interface application 130 or virtual agent 180. The incident management unit 122 can process data using natural language processor 120 and operational risk model 124 to understand downstream impact of outages, unexpected events, or other changes based of upstream incidents for changes. The platform 100 can implement server performance anomaly detection using event detector 122 to predict outages and degradation of infrastructure and correct calibration of alerts using K means clustering for example. The incident management unit 122 can implement unusual or anomalous trade detection by flagging and identifying irregular trades using a clustering process for example. The incident management unit 122 can implement margin call response classification. The incident management unit 122 can process data using natural language processor 120 and machine learning to classify counterparty response on merchant calls to determine whether the response is yes or no and can also determine the sentiment of the response.

The virtual agent 180 can implement a "chatbot" to provide output based on predictive/prescriptive model 126. The virtual agent 180 can integrate with natural language processor 120 for text analysis and summary report generation. The virtual agent 180 can integrate with cognitive search to enable processing of search requests and retrieval of search results. The platform 100 involves cognitive automation by combining machine learning and deep learning (as part of predictive/prescriptive models 126 and operational risk model 124) with natural language processor 120 to provide output at an interactive virtual agent 180 (which can be a chatbot, for example). The platform 100 using computing processes with self-learning systems that use data mining, pattern recognition and natural language processing to mimic the way the human brain works. The platform 100 provides an automated IT systems that is capable of resolving incidents without requiring human assistance.

The virtual agent 180 can display condensed summaries of a large amount of data and can link the summaries to predictive models 126 and operational risk models 124 to identify risk events and provide summaries of those events. The virtual agent 180 can have a search interface to receive inquiries and provide responses. The virtual agent 180 can receive anomaly detection alerts such as a system access from inappropriate device or location. As another example, the platform 100 can detect anomaly behaviours using a model to determine whether an employee contains any accesses that are abnormal based on the accesses that other individuals on their team have. For each employee a Jaccard Index can be computed between themselves and every other employee in the team. Then for each employee an average Jaccard index is calculated and used to classify their accesses as either normal, warning or abnormal. The virtual agent 180 can deliver alerts relating to the anomalies. In other examples, this model can be used to generate alerts for intrusion detection on any device.

The platform 100 can implement a virtual agent 180 which can be an automated chatbot agent with a focus on providing IT production support based on predictive/prescriptive models 126, natural language processor 120 and machine learning.

The platform 100 can build models 124, 126 to answer questions for solutions to problems/incidents posed in natural language via virtual agent 180. The platform 100 can enable continuous expansion of knowledge base for L1/L2 support analysts to reduce triage and resolution cycle time. The platform 100 can receive input from virtual agent 180 for Natural Language Processor 120 from L2 analysts for example. The platform 100 can integrate with an enterprise chat room as front-end display of model outputs and enable automatic initiation of Chat Rooms when required. The platform 100 can enable automatic initiation of P1/P2 incidents for Chat Rooms, based on prediction of incident severity using prediction model 126, for example.

In some institutions, client relationship management teams meet with external clients on a daily basis to discuss key insights. In some embodiments, the platform can provide for each one of these client interactions to be logged into a client interaction database. As the amount of interaction metadata increases the opportunity to understand and leverage this data also increases.

As illustrated in FIG. 15, the platform can in some embodiments use a Neural Network Classification model to classify each of the client interactions as either relevant or irrelevant. The machine learning model was built using a python hosted RESTFUL API service.

In some embodiments, the platform is configured for: receiving an interaction data set including data representing an interaction type, an interaction length, a number of clients, a number of internal executives, and an interaction description text including the natural language message data; inputting the interaction data set into a machine learning classification model including a multilayer perceptron to generate a relevant interaction score; and generating signals for outputting the sentiment score, wherein the sentiment score represents a relevant interaction score for an interaction corresponding to the interaction data set.

1. Data arrives via post call to the Python REST API
2. Key features are then parsed out of the inputted JSON
3. The following variables are then passed through the machine learning model:
   a) Interaction notes
   b) Interaction type
   c) Time Spent
   d) Number of Clients Present
   e) Number of Internal Executive Present
4. The Machine Learning Classification Model is a (neural network) multilayer perceptron with hyper parameters of a minimum of 3 hidden units and a maximum of 11 hidden units with an error function of both sum of squares and cross entropy.

5. The output of the model represent the probability of a relevant interaction. Ranging from (0-100).

6. The probability is then outputted back to the user in JSON format.

Python Libraries: requests, flask, pandas, waitress, datetime

Sample input/Output:

Input: {"Notes": "Took Kyle out to dinner as he was on vacation. It was awesome and great and amazing and fun", "Interaction Type": "Meeting", "Time Spent (Min)": "120", "Internal Executive AttendanceCount": "2","Client Attendees Count": "2"}

Output: {"Label": 1.0, "Score": 0.7120590069813979}

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g. graph database), and persistent storage 114.

The communication interface 106 can enable the agent platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities 150.

Figure 2:
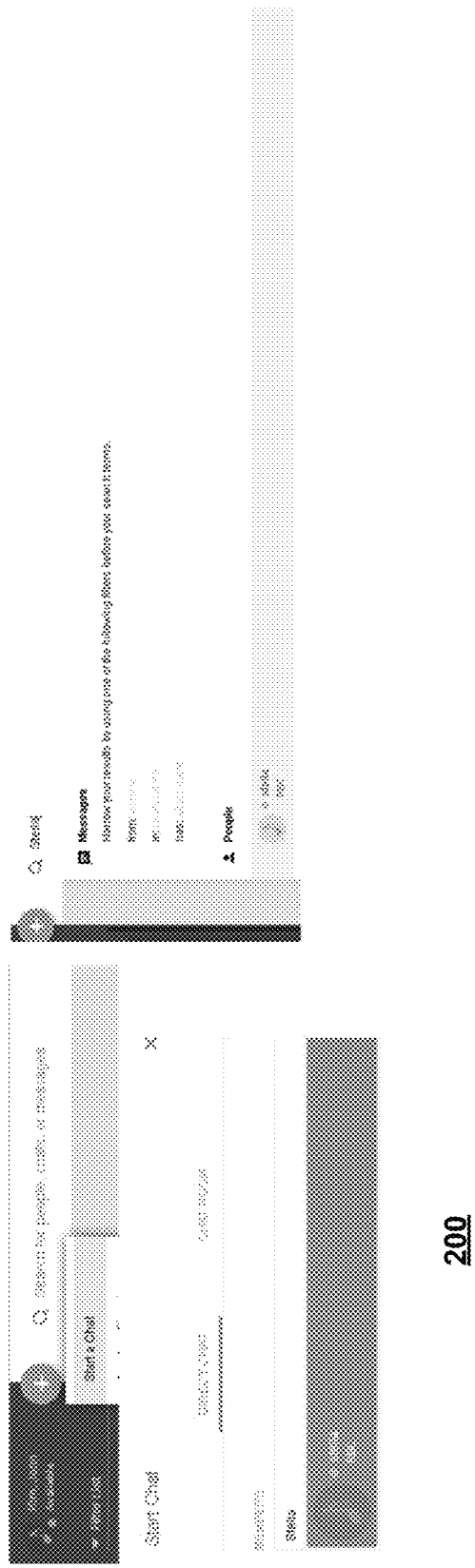
FIG. 2 is an example interface for a virtual agent according to some embodiments.

FIG. 2 is an example interface 200 for a virtual agent 180 according to some embodiments. The interface 200 can be activated by starting a chatroom (+button) or searching for "chat bot" in a search bar, for example.

Figure 3:
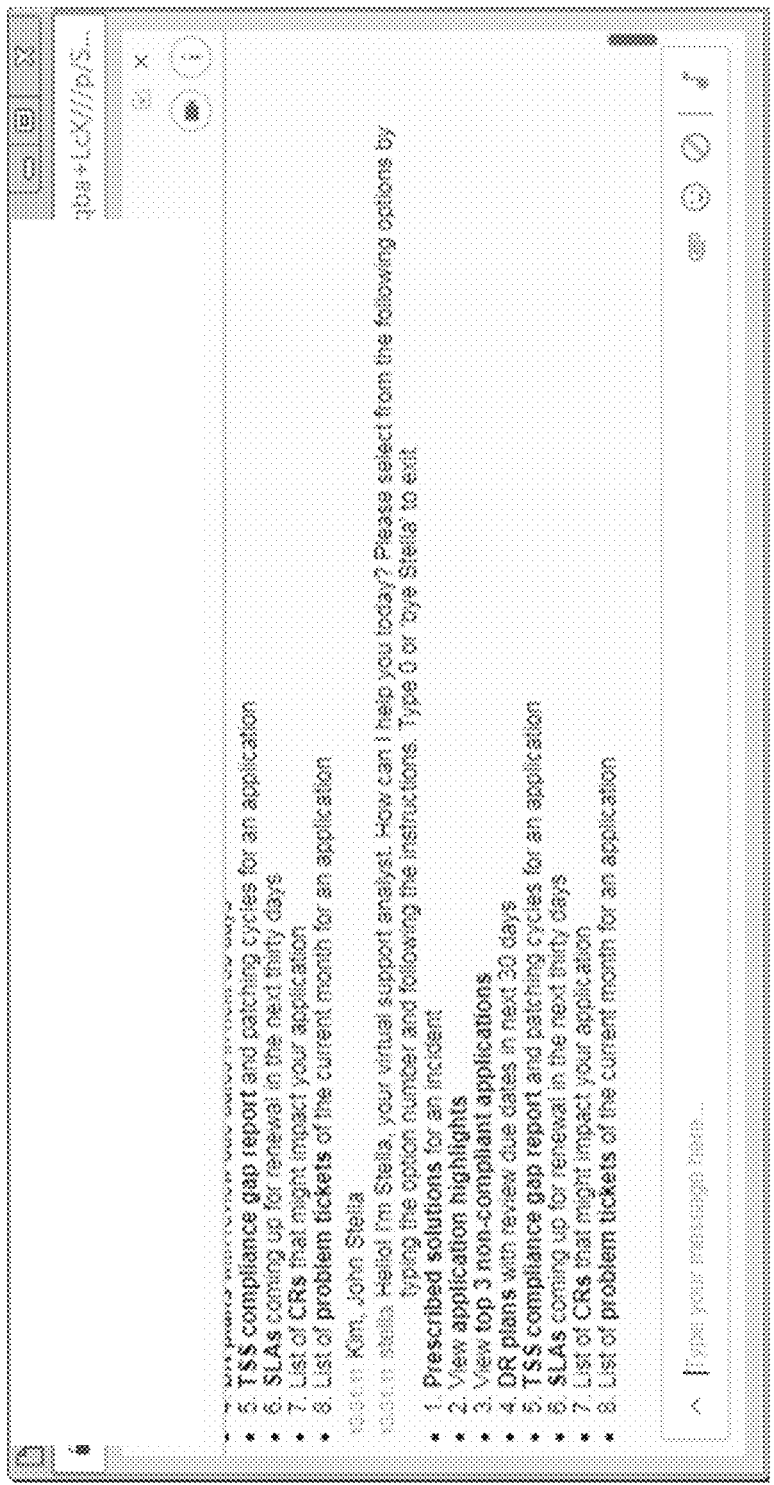
FIG. 3 is another example interface for a virtual agent according to some embodiments.

FIG. 3 is another example interface 300 for a virtual agent 180 according to some embodiments. The virtual agent 180 can provide answers for application support. As shown, there can be a text dialogue between users and virtual agent 180 as a set of user queries and responses.

Figure 4:
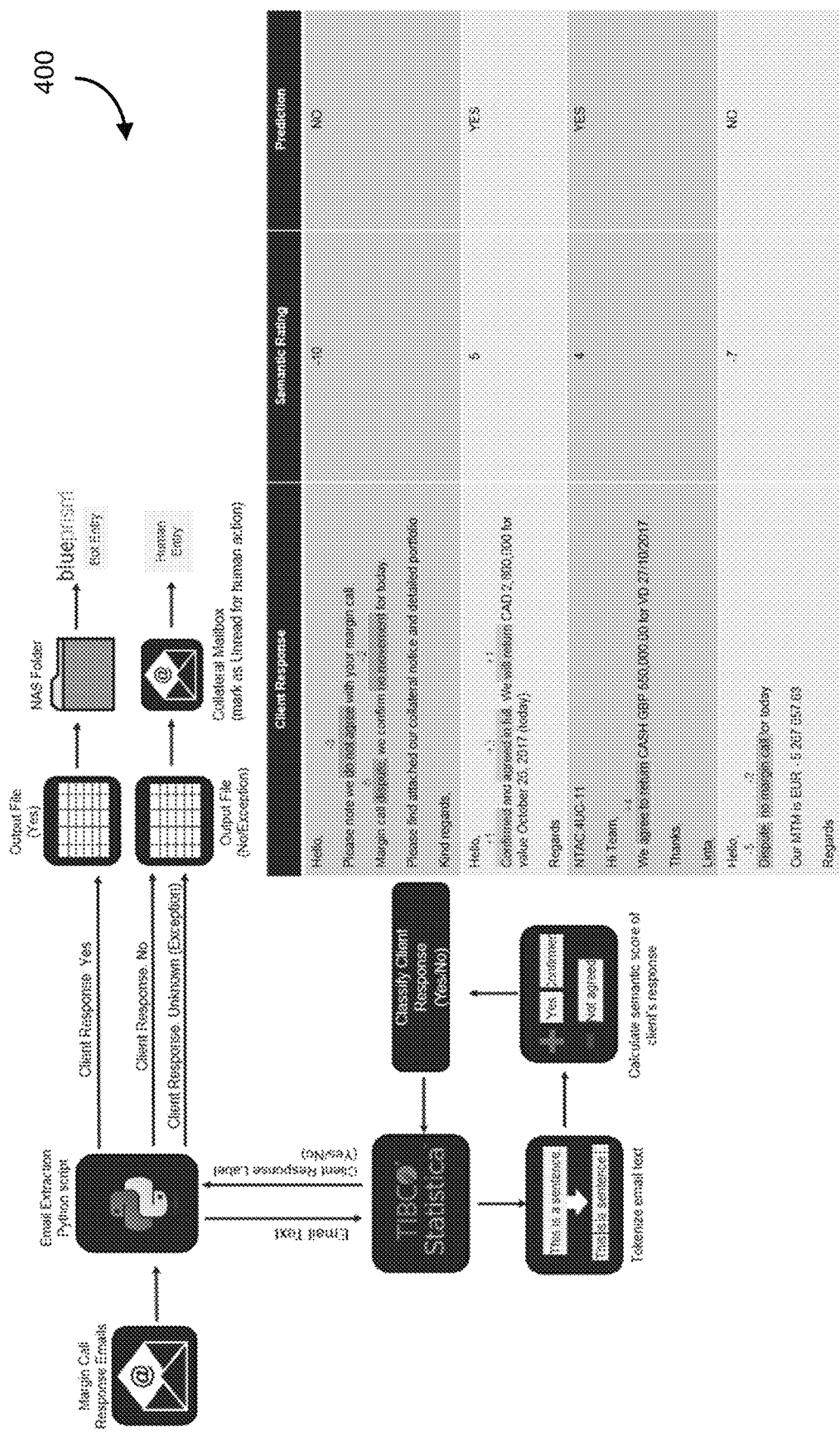
FIG. 4 is a schematic diagram for response classification according to some embodiments.

FIG. 4 is a schematic diagram 400 for margin call response classification. A virtual agent 180 can implement intelligent process automation to replace manual clicks (RPA), interpret text communications (using machine learning and natural language processor 120), make rule based decisions that do not have to be preprogrammed, offer suggestions, and provide real time tracking of handoffs between systems and people.

The example relates to a Margin Call Counterparty Response Classification process. The platform 100 can generate a semantic score for processed text data. For example, the semantic score can be computed by tokenizing text and scoring the tokenized text using positive and negative dictionaries. The text is classified by aggregating the scores to generate the overall semantic score.

The example relates to a Margin Call Counterparty Response Classification process. The platform 100 can generate a semantic score for processed text data. The virtual agent 180 can implement margin call functionality using different components. An example component can involve the classification of the response as either a Yes or No by virtual agent and natural language processor 120. This component can be implemented using a custom build dictionary that assigns a sentiment score to each word/phrase and based on the aggregated sentiment score, and classifies the response as either a Yes or No. Another example component is the extraction of the notional amount, currency type, client name, and the value date for populating a data structure for a margin call instance. This can be implemented using a code language (e.g. python) customized with regular expressions. This component can translate various date and dollar amounts into a standardized format.

In some embodiments, a natural language processing system includes at least one memory and at least one processor configured for: receiving natural language message data including a data representation of user-inputted text; tokenizing the data representation into a data set of sentences; generating a sentiment score for the natural language message data; and triggering a data processing task based on the sentiment score.

In some embodiments, the system is configured for receiving from a messaging system a plurality of messages, each message including natural language message data including a data representation of user-inputted text potentially including instructions for a data processing activity; generating the sentiment score for each sentence in the data set of sentences based on a frequency of words in the sentence corresponding to a word in a positive word data set and a frequency of words in the sentence corresponding to a word in a negative word data set; based on an aggregate sentiment score from the sentiment scores for the sentences, identifying a message as positive or negative; and for each message identified as positive, generating signals to initiate a data processing task corresponding to data extracted from the message. data processing task is a data process for initiating a margin call, and wherein the at least one memory and the at least one processor are configured for: parsing the message identified as positive for a date and a notional amount for the margin call based on one or more regular expression searches; and generating the signals to initiate the data processing task using the notional amount and the date.

For example, in some embodiments, as emails arrive to an outlook inbox, their content is extracted using python and an Outlook API. The email text is then sent to the platform where the email is classified as either a positive response of negative response. A positive response is interpreted as a confirmation of the margin call and a negative response is interpreted as a dispute. A python script then extracts key values from the email body (notional amount+date) using regular expression search. The clients response with the notional amount and date are then stored in an excel file for downstream processing, or a data process is generated which automatically processes the request.

In some embodiments, a customized word dictionary is created and updated for the Margin call email classification. The dictionary consists of a set of tokens where each token can be a word, a phrase or combination of certain words. The dictionary also assigns each token a sentiment score, which could be both positive and negative integers. The algorithm analyses the margin call email raw text word by word and does a sentiment analysis on the email as a whole. It finds all the dictionary tokens that occur in the email and sum up the total score. If the score is positive, then the algorithm will classify the email as "Yes, Confirmed", else if the score is negative or 0, the algorithm will classify the email as "Not agreed", otherwise it will respond error if the algorithm occurs an unknown exception.

In some embodiments, the Python script handles email parsing for Margin Call. As margin call emails are written in natural languages, identifying trading date from the email is a very complicated challenge. Dates could be written in words and/or numbers, and there is no guarantee what the date format is. In order to fully automate the margin call booking process, we developed an algorithm to not only extract the correct date from the email, but also to understand the actual date value. The algorithm uses regular expressions to extract applicable strings from the email that resemble a date. Then for each string, it tries to parse the string into three components of a date, which is Year, Month and Day. As the date format is unknown, the algorithm will generate a combination of all possible dates, and then validate each one if it is valid. The pseudo code is given below:

Extract potential date strings from email based on a regular expression set

For potential date strings that could have English as month, we have the below regular expressions:

```
regex="("+MonthName+"[^a-zA-Z0-9]*([0-9]{1,4})
   (nd|st|th)?[^a-zA-Z0-9]+[0-9]{1,4}(nd|st|th)?)"

regex="(([0-9]{1,4}(nd|st|th)?[^a-zA-Z0-9]+[0-9]{1,
   4}(nd|st|th)?[^a-zA-Z0-9]*"+MonthName+")"

regex="(([0-9]{1,4}(nd|st|th)?[^0-9A-Za-z]*)?"+
   MonthName+"([^0-9A-Za-z]*[0-9]{1,4}
   (nd|st|th)?)?)"

regex="(([0-9]{1,4}(nd|st|th)?[\s]*of[\s]+)"+Month-
   Name+"(?=[^a-zA-Z]|$))"
``` whereas MonthName could be any month from Janurary to December or from their abbreviations.

For potential date strings without English as month, we have:

```
regex="([0-9]{1,4}[-/][0-9]{1,4}([-/][0-9]{1,4})?)"
```

For each raw date string, parse it into day, month, year components. If the string has English in it, match the English token in the string to a month integer value. If an integer has st, th, nd following it, regard the integer as a day value.

Validate the day, month and year components as the following: A day component cannot be greater than 31, a month component cannot be greater than 12. Any invalid day, month and year combination will be filtered out. Also, check the corresponding month to see if how many days there could be in the month (28~31). If a year component is missing, fill the year component with the same year value as the email received date.

Iterate through all the remaining possible combinations and find the one that is after the email received date and closest to the email received date.

The platform 100 can involve building models 126 for predicting incidents and outages; prescribing solutions for the incidents and outages; detecting relationship of data elements; predicting operational risk events; predicting business impact and integrating this with the virtual agent 108 for user communication.

Figure 5:
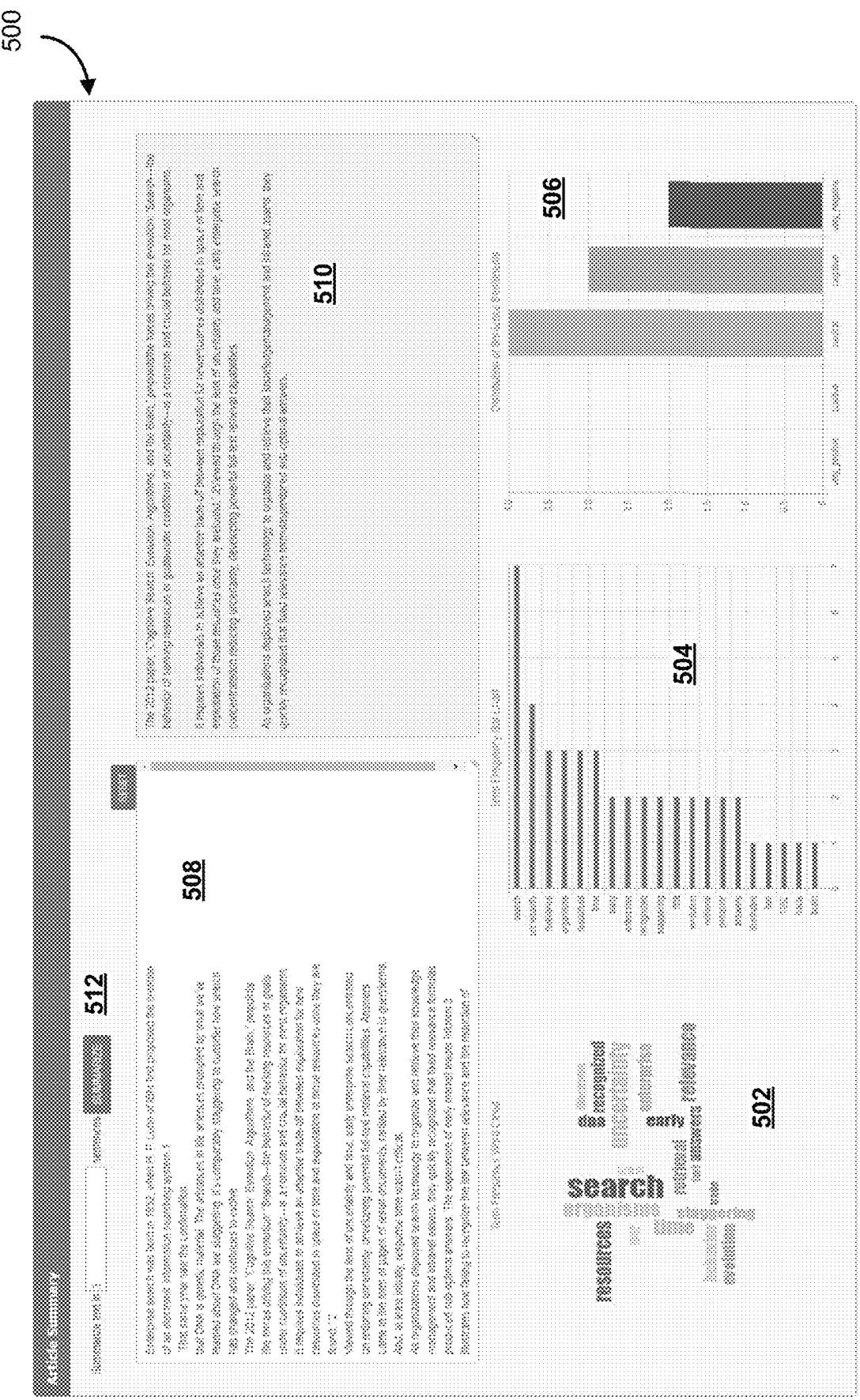
FIG. 5 is an example interface for report summary according to some embodiments.

FIG. 5 is an example interface 500 with visual elements for summary reports (e.g. text summarizer) according to some embodiments. The interface 500 can also include a search field for application code or application name to trigger generation of a summary report for the application code or application name. The interface 500 includes visual elements for input text 508 and visual elements for output text 510 (e.g. summary report). The platform 100 processes the input text to generator the summary report 510 based on report parameters received at a report command field 512 and natural language processor 120. The report command field 512 can receive report parameters, such as a number of sentences to output in the summary report 510 based on the input data 508 (e.g. summarize input data 508 in X sentences). The interface 500 includes visual elements for a term frequency word cloud 502 based on the input data 508. The interface 500 includes visual elements for term frequency bar chart 504 based on the input data 508. The interface 500 includes visual elements for distribution of sentence sentiments based on the input data 508.

The natural language processor 120 can summarize input data 508 using either Latent Semantic Analysis (LSA) or Keyword Rank Algorithm. The natural language processor 120 can computationally summarize an article/inputted text to extract the main concepts/ideas to generate output text 510. The natural language processor 120 can receive summary parameters (e.g. a number of sentences or a number of words) to constrain the generation of the output text 510.

The natural language processor 120 can generate a term-frequency word cloud 502 and bar chart 504. The word cloud 502 and the term-frequency bar chart 504 can provide a glimpse into the top key words that are being discussed in the document. The size of the words of the cloud 502 can determine by the amount of times the word appears in the document. The platform can generate dynamic visual elements for interface application 130 to display different size words.

Figure 6:
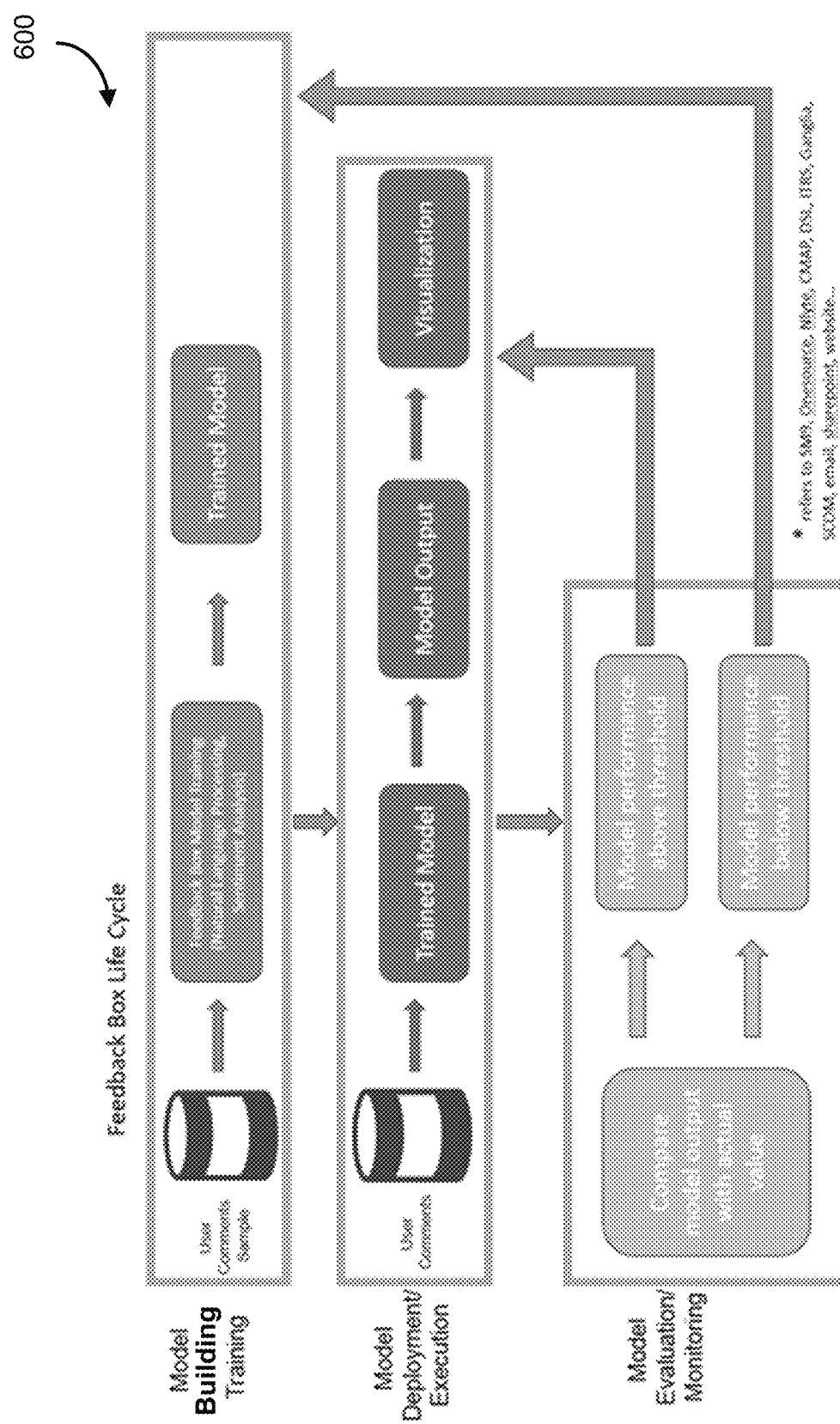
FIG. 6 is a workflow diagram for feedback classification according to some embodiments.

FIG. 6 is a schematic diagram of an architecture 600 for feedback box data analysis according to some embodiments.

The platform 100 can predict the sentiment behind user comments submitted via "Feedback Box" form or field (e.g. at interface application 130 or virtual agent 180), which helps to filter out the inappropriate/hate comments for compliance. The platform 100 can extract the underlying key topics behind user comments submitted via "Feedback Box" application (e.g. interface application 130 or virtual agent 180), helping the reviewer of the feedback comments to quickly grasp the key topics out of huge amount of data. The topics can be identified using Latent Semantic Analysis (LSA) or Keyword Rank Algorithm, for example.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

What is claimed is:

1. A system for natural language processing, the system comprising:
at least one memory and at least one processor configured for:
receiving, via a virtual agent interface, natural language data including a data representation of user-inputted text;
generating, with a frontend data processing layer, a communication tuple including at least one data field containing the data representation of the user-inputted text, and a sequence identifier identifying positioning of the user-inputted text in a series of communications, and communicating the communication tuple to a cognitive data processing layer;
parsing, with the cognitive data processing layer, the data representation of the user-inputted text, and upon determining the user-inputted text is indicative of an information technology (IT) incident based on the parsing, identifying an incident identifier and communicating the incident identifier to a database processing layer;
generating, with the database processing layer, an incident data set associated with the incident identifier, the incident data set including a title, description and list of computer symptoms associated with the incident identifier;
performing, with the cognitive data processing layer, a text similarity algorithm with the incident data set to generate an ordered list of closest matching historical IT incidents;
generating and communicating a solution tuple including a response sequence identifier identifying a position of a response message in the series of communications, and a plurality of closest solution data sets corresponding to highest ranked historical IT incidents in the ordered list of closest matching historical IT incidents; and
generating, with the frontend data processing layer, signals for outputting, via the virtual agent interface, the response message including data from the plurality of closest solution data sets at the identified position in the series of communications.

2. The system of claim 1, wherein upon communicating the communication tuple to the backend data processing layer, the frontend data processing layer is configured to generate signals to provide an output, via the virtual agent interface, indicating that a virtual agent is composing a response.

3. The system of claim 1, wherein upon identification of the incident identifier, the frontend data processing layer is configured to generate signals to output an intermediate message, via the virtual agent interface, indicating that the virtual agent is searching for a solution for the incident.

4. The system of claim 1, wherein the frontend data processing layer, the cognitive data processing layer, and the database processing layer are defined by software instructions written in different programming languages, and wherein each layer is configured to communicate with a single communication tuple data structure enabling each layer to communicate with each of the other layers without data transformation.

5. The system of claim 1, wherein the virtual agent interface is an electronic messaging interface provided by an electronic messaging platform.

6. The system of claim 5, wherein when the electronic messaging platform is facilitating a group chat involving a plurality of users and the virtual agent, the frontend data processing layer is configured to communication the tuple including the at least one data field containing the data representation of the user-inputted text corresponding to a group chat message upon determining that the group chat message is intended to be directed at the virtual agent.

7. The system of claim 1, wherein the virtual agent interface is a voice interface, and wherein the at least one memory and the at least one processor are configured for: receiving audio input data representing the natural language data; and generating the data representation of user-inputted text with a speech-to-text decoder.

8. The system of claim 5, wherein the at least one memory and the at least one processor are configured for: generating a close line instruction to close an audio stream on an audio interface upon determining the user-inputted text is indicative of an information technology (IT) incident to enable the virtual agent interface to output an audio response on the audio interface.

9. The system of claim 1, wherein the virtual agent interface is an automated ticketing tool configured to identify newly submitted IT incident data structures.

\* \* \* \* \*